(12) United States Patent
Luo

(10) Patent No.: US 9,392,391 B2
(45) Date of Patent: Jul. 12, 2016

(54) METHODS AND APPARATUS FOR COORDINATION OF SENDING REFERENCE SIGNALS FROM MULTIPLE CELLS

(71) Applicant: Qualcomm Incorproated, San Diego, CA (US)

(72) Inventor: Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 58 days.

(21) Appl. No.: 13/942,928

(22) Filed: Jul. 16, 2013

(65) Prior Publication Data

US 2013/0301531 A1     Nov. 14, 2013

Related U.S. Application Data

(62) Division of application No. 12/818,464, filed on Jun. 18, 2010, now Pat. No. 8,670,432.

(60) Provisional application No. 61/219,354, filed on Jun. 22, 2009.

(51) Int. Cl.
| | |
|---|---|
| *H04W 4/00* | (2009.01) |
| *H04B 7/02* | (2006.01) |
| *H04L 5/00* | (2006.01) |
| *H04W 72/08* | (2009.01) |
| *H04W 24/02* | (2009.01) |
| *H04L 25/02* | (2006.01) |
| *H04W 72/04* | (2009.01) |
| *H04W 84/04* | (2009.01) |

(52) U.S. Cl.
CPC ............... *H04W 4/00* (2013.01); *H04B 7/024* (2013.01); *H04L 5/005* (2013.01); *H04L 5/0035* (2013.01); *H04L 5/0048* (2013.01); *H04L 5/0058* (2013.01); *H04L 5/0073* (2013.01); *H04L 5/0094* (2013.01); *H04W 24/02* (2013.01); *H04W 72/082* (2013.01); *H04L 5/0037* (2013.01); *H04L 25/0228* (2013.01); *H04W 72/0426* (2013.01); *H04W 84/045* (2013.01); *H04W 84/047* (2013.01)

(58) Field of Classification Search
None
See application file for complete search history.

(56) References Cited

U.S. PATENT DOCUMENTS

| | | |
|---|---|---|
| 7,068,743 B1 | 6/2006 | Suzuki |
| 7,286,593 B1 | 10/2007 | Banerjee |

(Continued)

FOREIGN PATENT DOCUMENTS

| | | |
|---|---|---|
| EP | 2219302 A1 | 8/2010 |
| JP | H0884105 A | 3/1996 |

(Continued)

OTHER PUBLICATIONS

European Search Report—EP13020110—Search Authority—Hague—Nov. 4, 2013.

(Continued)

*Primary Examiner* — Minh-Trang Nguyen
(74) *Attorney, Agent, or Firm* — Dalei Dong

(57) ABSTRACT

Methods and apparatus for coordination of sending reference signals in wireless network are disclosed. A network node may select a cell ID based on a measurement of adjacent cells so as to mitigate interference. A network node may communicate information to another network node to control transmitted resources in a protected interval so as to measure channel characteristics.

24 Claims, 9 Drawing Sheets

(56) References Cited

U.S. PATENT DOCUMENTS

| | | | |
|---|---|---|---|
| 7,469,013 | B1 | 12/2008 | Bolt et al. |
| 7,529,265 | B1 | 5/2009 | Nicholas |
| 8,289,946 | B2 | 10/2012 | Luo et al. |
| 8,654,815 | B1 | 2/2014 | Forenza et al. |
| 2004/0022205 | A1 | 2/2004 | Miyata et al. |
| 2004/0161057 | A1 | 8/2004 | Malladi et al. |
| 2004/0208138 | A1 | 10/2004 | Hayashi et al. |
| 2005/0025092 | A1 | 2/2005 | Morioka et al. |
| 2006/0233222 | A1 | 10/2006 | Reial et al. |
| 2007/0135051 | A1* | 6/2007 | Zheng et al. ............ 455/63.1 |
| 2007/0281653 | A1 | 12/2007 | Haub |
| 2007/0297522 | A1 | 12/2007 | Baggen et al. |
| 2008/0247445 | A1 | 10/2008 | Guo et al. |
| 2008/0268786 | A1* | 10/2008 | Baker et al. ............ 455/67.11 |
| 2008/0298524 | A1 | 12/2008 | Koorapaty et al. |
| 2008/0310558 | A1 | 12/2008 | Gaikwad et al. |
| 2009/0040985 | A1 | 2/2009 | Barnawi et al. |
| 2009/0069023 | A1 | 3/2009 | Ahn et al. |
| 2009/0075661 | A1 | 3/2009 | Takagi |
| 2009/0110033 | A1 | 4/2009 | Shattil |
| 2009/0110048 | A1 | 4/2009 | Luschi et al. |
| 2009/0201906 | A1 | 8/2009 | Fukui |
| 2010/0073229 | A1* | 3/2010 | Pattabiraman et al. .. 342/357.09 |
| 2010/0098194 | A1 | 4/2010 | Reial |
| 2010/0322227 | A1 | 12/2010 | Luo |
| 2013/0303157 | A1 | 11/2013 | Tao |
| 2013/0303217 | A1 | 11/2013 | Tao |

FOREIGN PATENT DOCUMENTS

| | | |
|---|---|---|
| JP | 2000083011 A | 3/2000 |
| JP | 2001320761 A | 11/2001 |
| JP | 2002505053 A | 2/2002 |
| JP | 2002077980 A | 3/2002 |
| JP | 2003179544 A | 6/2003 |
| JP | 2003209535 A | 7/2003 |
| JP | 2005094672 A | 4/2005 |
| JP | 2005303952 A | 10/2005 |
| JP | 2005354459 A | 12/2005 |
| JP | 2007300503 A | 11/2007 |
| JP | 2008520151 A | 6/2008 |
| JP | 2009521179 A | 5/2009 |
| RU | 2120183 C1 | 10/1998 |
| RU | 2188503 C1 | 8/2002 |
| TW | I264186 B | 10/2006 |
| TW | I279995 B | 4/2007 |
| TW | I300650 B | 9/2008 |
| TW | I303413 B | 11/2008 |
| WO | 9859511 A1 | 12/1998 |
| WO | WO-2004075432 | 9/2004 |
| WO | WO-2006051481 A2 | 5/2006 |
| WO | WO-2007072427 A1 | 6/2007 |
| WO | 2007105402 A1 | 9/2007 |
| WO | WO-2008058059 A2 | 5/2008 |
| WO | WO-2009009461 A1 | 1/2009 |
| WO | 2009023792 A1 | 2/2009 |
| WO | WO-2009024021 A1 | 2/2009 |
| WO | WO-2009039439 | 3/2009 |
| WO | 2009072178 A1 | 6/2009 |
| WO | 2009072355 A1 | 6/2009 |

OTHER PUBLICATIONS

Nortel: "Supporting and relay for Rel-8 UE in downlink," 3GPP TSG-RAN1 Meeting #55 R1-084460, 3GPP, Nov. 14, 2008.
Qualcomm Europe: "Carrier Aggregation in Heterogeneous Networks", 3GPP Draft; R1-092062, 3rd Generation Partnership Project (3GPP), Mobile Competence Centre ; 650, Route Des Lucioles ; F-06921 Sophia-Antipolis Cedex ; France, no. San Francisco, USA; 20090428, Apr. 28, 2009, XP050339520, [retrieved on Apr. 28, 2009].
3GPP TSG RAN WG3: "3GPP TS 36.423; Evolved Universal Terrestrial Radio Access Network (E-UTRAN); X2 Application Protocol (X2AP)", 3GPP TS 36.423 V8.5.0, vol. 36.423, No. V8.5.0, Mar. 1, 2009, pp. 1-100, XP002558909, [retrieved on Dec. 4, 2009].
3rd Generation Partnership Project; Technical Specification Group Radio Access Network; Further Advancements for E-UTRA Physical Layer Aspects(Release 9), 3GPP Draft; TR 36.814_130, 3rd Generation Partnership Project (3GPP), Mobile Competence Centre ; 650, Route Des Lucioles ; F-06921 Sophiaantipolis Cedex ; France, no. Shenzhen, China; 20090824, Jun. 1, 2009, pp. 1-46, XP050388254, [retrieved on Aug. 28, 2009].
Aziz D et al., "Improvement of LTE Handover Performance through Interference Coordination", 2009 IEEE 69th Vehicular Technology Conference; Apr. 26-29, 2009, Barcelona, Spain, IEEE, Piscataway, NJ, USA, Apr. 26, 2009, pp. 1-5, XP031474544, ISBN: 978-1-4244-2517-4.
Boudreau, et al., "Interference Coordination and Cancellation for 4G Networks", IEEE Communications Magazine, vol. 47, No. 4, Apr. 2009, pp. 74-81.
Chttl et al., "A Hybrid Concept of ICIC and CoMP for LTE-A: Initial Evaluation", 3GPP Draft; R1-090956, 3rd Generation Partnership Project (3GPP), Mobile Competence Centre; 650, Route Des Lucioles; F-06921 Sophia-Antipolis Cedex; France, no. Athens, Greece; pp. 1-5, Feb. 9-13, XP050318794, [retrieved on Feb. 4, 2009].
Ericsson: "Options for Inter-cell Interference Coordination (ICIC)" 3GPP Draft; R3-061199, 3rd Generation Partnership Project (3GPP), Mobile Competence Centre ; 650, Route Des Lucioles ; F-06921 Sophia-Antipolis Cedex ; France, vol. RAN WG3, no. Tallinn; 20060823, Aug. 23, 2006, XP050160110 [retrieved on Aug. 23, 2006] the whole document.
Feng S., et al., "Self-Organizing Networks (SON) in 3GPP Long Term Evolution", Nomor Research GmbH May 20, 2008, XP000002657762, Retrieved from the Internet: URL:http://www.nomor.de/uploads/gc/TQ/gcTQfDWApo9osPfQwQoBzw/
SelforganisingNetworksInLTE_2008-05.pdf [retrieved on Aug. 22, 2011].
Higuchi, et al., "Experimental evaluation of combined effect of coherent RAKE combining and SIR-based fast transmit power control for reverse link of DS-CDMA mobile radio," IEEE Journal on Selected Areas in Communications, vol. 18, Issue 8, Aug. 2000, pp. 1526-1535.
Higuchi, et al.: "Fast Cell Search Algorithm in Inter-Cell Asynchronous DS-CDMA Mobile Radio," IEICE Trans. Commun. vol. E81-B. No. 7, pp. 1527-1534, Jul. 1998.
International Search Report and Written Opinion—PCT/US2010/039527, ISA/EPO—Sep. 7, 2011.
NEC Corporation: "Self Organizing Network: NEC's proposals for next-generation radio network management", NEC Corporation, Feb. 28, 2009, XP000002657763, Retrieved from the Internet: URL:http://www.nec.com/global/solutions/nsp/lte/pdf/son.pdf [retrieved on Aug. 22, 2011].
Nokia Siemens Networks et al: "SON Use Case: Cell Phy_ID Automated Configuration", 3GPP Draft; R3-080376 (Phyid Autoconf), 3rd Generation Partnership Project (3GPP), Mobile Competence Centre ; 650, Route Des Lucioles ; F-06921 Sophia-Antipolis Cedex ; France, vol. RAN WG3, no. Sorrento, Italy; 20080205, Feb. 5, 2008, XP050163582, [retrieved on Feb. 5, 2008].
Qualcomm Europe: "CoMP Cooperative Silencing Hotzone DL Performance", 3GPP Draft; R1-092052 Comp Cooperative Silencing Hotzone DL Performance, 3rd Generation Partnership Project (3GPP), Mobile Competence Centre ; 650, Route Des Lucioles ; F-06921 Sophia-Antipolis Cedex ; France, vol. RAN WG3, no. San Francisco, CA. USA; 20090508, May 8, 2009, XP002630304.
Qualcomm Europe: "Coordinated Multi-Point downlink transmission in LTE-Advanced" 3GPP Draft; R1-084400 Comp, 3rd Generation Partnership Project (3GPP), Mobile Competence Centre ; 650, Route Des Lucioles ; F-06921 Sophia-Antipolis Cedex ; France, vol. RAN WG3, no. Prague, Czech Republic; 20081105, Nov. 5, 2008, XP050317663.
Taiwan Search Report—TW099120384—TIPO—Apr. 29, 2013.
3GPP: "3rd Generation Partnership Project; Technical Specification Group Radio Access Network; Evolved Universal Terrestrial Radio Access Network (EUTRAN); X2 Application Protocol (X2AP)," (3GPP TS 36.423 V8.0.0; rel. 8), Dec. 2007 pp. 4, section 9.1.2.1.

(56) References Cited

OTHER PUBLICATIONS

LTE: Evolved Universal Terrestrial Radio Access (E-UTRA) and Evolved Universal Terrestrial Radio Access Network (E-UTRAN); Overall description; Stage 2 (3GPP TS 36.300 version 8.9.0 Release 8), Technical Specification, European Telecommunications Standards Institute (ETSI), 650, Route Des Lucioles ; F-06921 Sophia-Antipolis ; France, No. V8.9.0, Jul. 1, 2009 pp. 4, section 16.1.5.
Taiwan Search Report—TW102139985—TIPO—May 22, 2015.
Taiwan Search Report—TW102141341—TIPO—Jun. 2, 2015.
Taiwan Search Report—TW102139986—TIPO—Jul. 3, 2015.

\* cited by examiner

METHODS AND APPARATUS FOR COORDINATION OF SENDING REFERENCE SIGNALS FROM MULTIPLE CELLS

CLAIM OF PRIORITY UNDER 35 U.S.C. §119

The present application for patent is a Divisional application of application Ser. No. 12/818,464, entitled METHOD AND APPARATUS FOR COORDINATION OF SENDING REFERENCE SIGNALS FROM MULTIPLE CELLS, filed Jun. 18, 2010 which claims priority to Provisional Application Ser. No. 61/219,354, entitled METHODS OF COORDINATION OF SENDING REFERENCE SIGNALS FROM MULTIPLE CELLS, filed on Jun. 22, 2009, the content of which is hereby incorporated by reference herein in its entirety for all purposes.

FIELD

This application is directed generally to wireless communications systems. More particularly, but not exclusively, the application relates to methods and apparatus for coordination of sending reference signals from multiple cells, such as in a long term evolution (LTE) network, as well as adjusting receivers based on measured interference.

BACKGROUND

Wireless communication systems are widely deployed to provide various types of communication content such as voice, data, video and the like, and deployments are likely to increase with introduction of new data oriented systems such as Long Term Evolution (LTE) systems. Wireless communications systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems and other orthogonal frequency division multiple access (OFDMA) systems.

Generally, a wireless multiple-access communication system can simultaneously support communication for multiple wireless terminals (also know as user equipments (UEs), or access terminals (ATs). Each terminal communicates with one or more base stations (also know as access points (APs), EnodeBs or eNBs) via transmissions on forward and reverse links. The forward link (also referred to as a downlink) refers to the communication link from the base stations to the terminals, and the reverse link (also referred to as an uplink) refers to the communication link from the terminals to the base stations. These communication links may be established via a single-in-single-out, single-in-multiple out, multiple-in-single-out or a multiple-in-multiple-out (MIMO) system. In MIMO systems, multiple antennas are used in both transmitters and receivers to improve communications performance without requiring additional transmit power or bandwidth. Next generation systems such as Long Term Evolution (LTE) allow for use of MIMO technology for enhanced performance and data throughput.

As the number of mobile stations deployed increases, the need for proper bandwidth utilization becomes more important. Moreover, with the introduction of semiautonomous base stations for managing small cells, such as femtocells, in systems such as LTE, interference with existing base stations may become an increasing problem.

SUMMARY

This disclosure relates generally to methods and apparatus for coordination of sending reference signals from multiple cells, such as in an LTE system.

In one aspect, the disclosure is directed to a method comprising receiving transmission coordination information provided by a first wireless network node and controlling wireless transmission from a second wireless network node in accordance with the transmission coordination information.

In another aspect, the disclosure is directed to a computer program product comprising a computer readable medium including codes for causing a computer to receive transmission coordination information provided by a first wireless network node and control wireless transmission from a second wireless network node in accordance with the transmission coordination information.

In another aspect, the disclosure is directed to an apparatus for use in a communication system comprising a coordination module configured to receive coordination information from a network node and a transmitter module configured to transmit a signal during a protected interval responsive to the coordination information.

In another aspect, the disclosure is directed to a method comprising receiving a first reference signal transmitted by a first network node, receiving a second reference signal transmitted by a second network node and modifying a functionality of a receiver based upon a relationship between the first reference signal and the second reference signal.

In another aspect, the disclosure is directed to a computer program product comprising a computer readable medium including codes for causing a computer to receive a first reference signal transmitted by a first network node, receive a second reference signal transmitted by a second network node, and modify a functionality of a receiver based upon a relationship between the first reference signal and the second reference signal.

In another aspect, the disclosure is directed to an apparatus for use in a communication system comprising a receiver module configured to receive a first reference signal transmitted by a first network node and a second reference signal transmitted by a second network node, and a control module configured to modify a functionality of a receiver based upon a relationship between the first reference signal and the second reference signal.

In another aspect, the disclosure is directed to a method comprising determining a time variation in a measurable parameter of one or more reference signals and modifying a functionality of a receiver based upon the time variation.

In another aspect, the disclosure is directed to a computer program product comprising a computer readable medium including codes for causing a computer to determine a time variation in a measurable parameter of one or more reference signals and modify a functionality of a receiver based upon the time variation.

In another aspect, the disclosure is directed to an apparatus for use in a communication system comprising a receiver module configured to determine a time variation in a measurable parameter of one or more reference signals, and a control module configured to modify a functionality of a receiver based upon the time variation.

In another aspect, the disclosure is directed to a method comprising determining a time variation in an interference level experienced by a receiver, generating a first channel estimate of a wireless communication channel as of a first time, generating a second channel estimate of the wireless communication channel as of a second time, weighting the first channel estimate and the second channel estimate in accordance with the time variation, thereby generating a first weighted channel estimate and a second weighted channel estimate, and computing a weighted channel estimate based upon the first weighted channel estimate and the second weighted channel estimate.

In another aspect, the disclosure is directed to a computer program product comprising a computer readable medium including codes for causing a computer to determine a time variation in an interference level experienced by a receiver, generate a first channel estimate of a wireless communication channel as of a first time, generate a second channel estimate of the wireless communication channel as of a second time, weight the first channel estimate and the second channel estimate in accordance with the time variation, thereby generating a first weighted channel estimate and a second weighted channel estimate, and compute a weighted channel estimate based upon the first weighted channel estimate and the second weighted channel estimate.

In another aspect, the disclosure is directed to an apparatus for use in a communication system comprising a receiver module configured to receive a signal from a wireless communications channel and determine a time variation in an interference level in the channel and a channel estimation module configured to generate a first channel estimate of a wireless communication channel as of a first time and a second channel estimate of the wireless communication channel as of a second time, weight the first channel estimate and the second channel estimate in accordance with the time variation, thereby generating a first weighted channel estimate and a second weighted channel estimate, and compute a weighted channel estimate based upon the first weighted channel estimate and the second weighted channel estimate.

In another aspect, the disclosure is directed to a method comprising receiving a reference signal transmitted by a first network node in accordance with a first reference signal resource pattern and selecting, for a second network node, a cell identifier associated with a second reference signal resource pattern different from the first reference signal resource pattern.

In another aspect, the disclosure is directed to a computer program product comprising a computer readable medium including codes for causing a computer to receive a reference signal transmitted by a first network node in accordance with a first reference signal resource pattern and select for a second network node, a cell identifier associated with a second reference signal resource pattern different from the first reference signal resource pattern.

In another aspect, the disclosure is directed to an apparatus for use in a communication system comprising a receiver module configured to receive a reference signal transmitted by a first network node in accordance with a first reference signal resource pattern, and a reference signal selector module configured to select a cell identifier associated with a second reference signal resource pattern different from the first reference signal resource pattern.

Additional aspects are further described below in conjunction with the appended drawings.

BRIEF DESCRIPTION OF THE DRAWINGS

The present application may be more fully appreciated in connection with the following detailed description taken in conjunction with the accompanying drawings, wherein.

DETAILED DESCRIPTION

Figure 1:
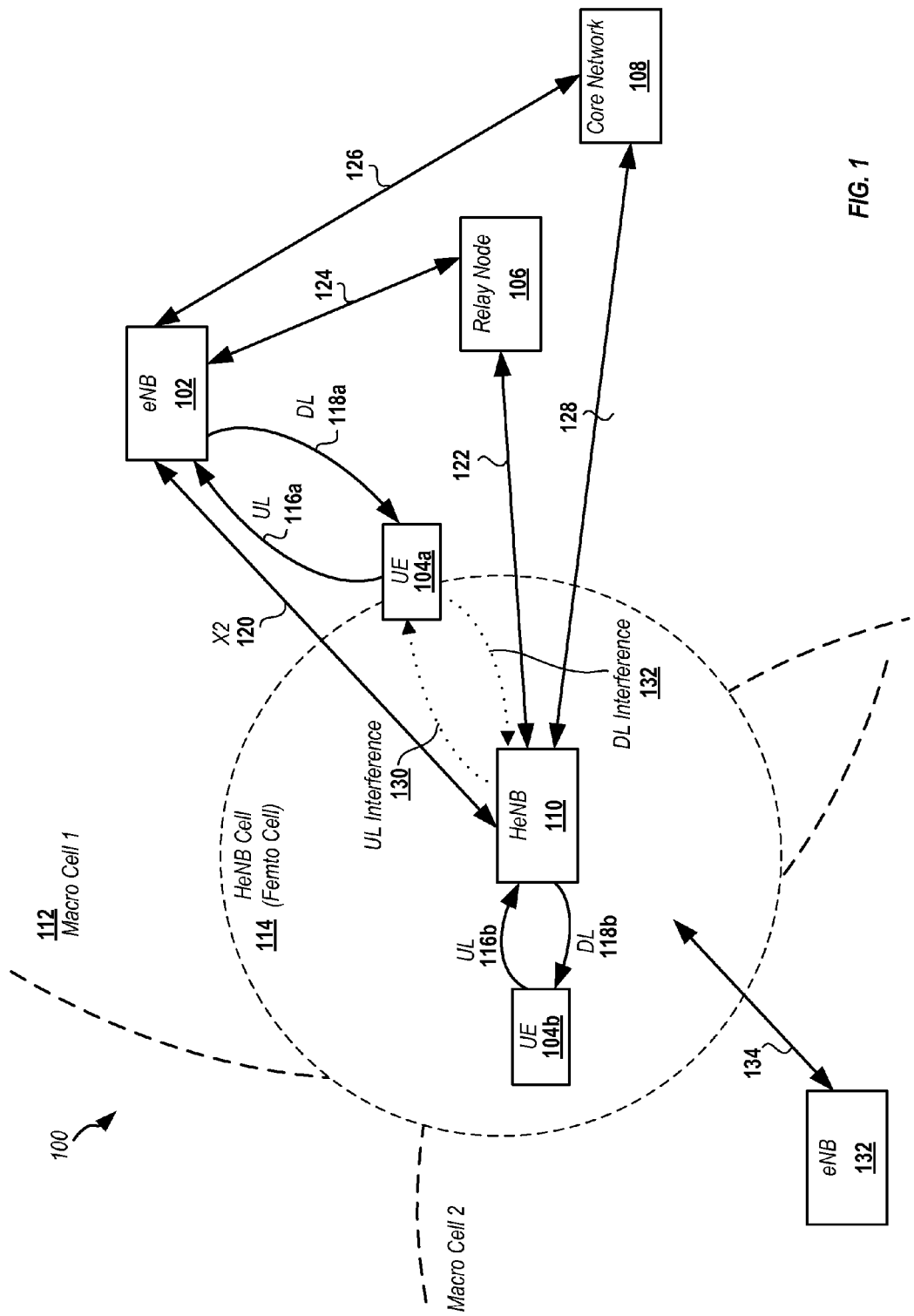
FIG. 1 illustrates details of a wireless communications system including multiple cells.

This disclosure relates generally to interference coordination and management in wireless communications systems. In various embodiments, the techniques and apparatus described herein may be used for wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, LTE networks, as well as other communications networks. As described herein, the terms "networks" and "systems" may be used interchangeably.

In one aspect, the disclosure is directed to a method comprising receiving transmission coordination information provided by a first wireless network node and controlling wireless transmission from a second wireless network node in accordance with the transmission coordination information.

In another aspect, the disclosure is directed to a computer program product comprising a computer readable medium including codes for causing a computer to receive transmission coordination information provided by a first wireless network node and control wireless transmission from a second wireless network node in accordance with the transmission coordination information.

In another aspect, the disclosure is directed to an apparatus for use in a communication system comprising a coordination module configured to receive coordination information from a network node and a transmitter module configured to transmit a signal during a protected interval responsive to the coordination information.

In another aspect, the disclosure is directed to a method comprising receiving a first reference signal transmitted by a first network node, receiving a second reference signal transmitted by a second network node and modifying a functionality of a receiver based upon a relationship between the first reference signal and the second reference signal.

In another aspect, the disclosure is directed to a computer program product comprising a computer readable medium including codes for causing a computer to receive a first reference signal transmitted by a first network node, receive a second reference signal transmitted by a second network node, and modify a functionality of a receiver based upon a relationship between the first reference signal and the second reference signal.

In another aspect, the disclosure is directed to an apparatus for use in a communication system comprising a receiver module configured to receive a first reference signal transmitted by a first network node and a second reference signal transmitted by a second network node, and a control module configured to modify a functionality of a receiver based upon a relationship between the first reference signal and the second reference signal.

In another aspect, the disclosure is directed to a method comprising determining a time variation in a measurable parameter of one or more reference signals and modifying a functionality of a receiver based upon the time variation.

In another aspect, the disclosure is directed to a computer program product comprising a computer readable medium including codes for causing a computer to determine a time variation in a measurable parameter of one or more reference signals and modify a functionality of a receiver based upon the time variation.

In another aspect, the disclosure is directed to an apparatus for use in a communication system comprising a receiver module configured to determine a time variation in a measurable parameter of one or more reference signals, and a control module configured to modify a functionality of a receiver based upon the time variation.

In another aspect, the disclosure is directed to a method comprising determining a time variation in an interference level experienced by a receiver, generating a first channel estimate of a wireless communication channel as of a first time, generating a second channel estimate of the wireless communication channel as of a second time, weighting the first channel estimate and the second channel estimate in accordance with the time variation, thereby generating a first weighted channel estimate and a second weighted channel estimate, and computing a weighted channel estimate based upon the first weighted channel estimate and the second weighted channel estimate.

In another aspect, the disclosure is directed to a computer program product comprising a computer readable medium including codes for causing a computer to determine a time variation in an interference level experienced by a receiver, generate a first channel estimate of a wireless communication channel as of a first time, generate a second channel estimate of the wireless communication channel as of a second time, weight the first channel estimate and the second channel estimate in accordance with the time variation, thereby generating a first weighted channel estimate and a second weighted channel estimate, and compute a weighted channel estimate based upon the first weighted channel estimate and the second weighted channel estimate.

In another aspect, the disclosure is directed to an apparatus for use in a communication system comprising a receiver module configured to receive a signal from a wireless communications channel and determine a time variation in an interference level in the channel and a channel estimation module configured to generate a first channel estimate of a wireless communication channel as of a first time and a second channel estimate of the wireless communication channel as of a second time, weight the first channel estimate and the second channel estimate in accordance with the time variation, thereby generating a first weighted channel estimate and a second weighted channel estimate, and compute a weighted channel estimate based upon the first weighted channel estimate and the second weighted channel estimate.

In another aspect, the disclosure is directed to a method comprising receiving a reference signal transmitted by a first network node in accordance with a first reference signal resource pattern and selecting, for a second network node, a cell identifier associated with a second reference signal resource pattern different from the first reference signal resource pattern.

In another aspect, the disclosure is directed to a computer program product comprising a computer readable medium including codes for causing a computer to receive a reference signal transmitted by a first network node in accordance with a first reference signal resource pattern and select for a second network node, a cell identifier associated with a second reference signal resource pattern different from the first reference signal resource pattern.

In another aspect, the disclosure is directed to an apparatus for use in a communication system comprising a receiver module configured to receive a reference signal transmitted by a first network node in accordance with a first reference signal resource pattern, and a reference signal selector module configured to select a cell identifier associated with a second reference signal resource pattern different from the first reference signal resource pattern.

Various other aspects and features of the disclosure are further described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

A CDMA network may implement a radio technology such as Universal Terrestrial Radio Access (UTRA), cdma2000 and the like. UTRA includes Wideband-CDMA (W-CDMA) and Low Chip Rate (LCR). Cdma2000 covers IS-2000, IS-95 and IS-856 standards. A TDMA network may implement a radio technology such as Global System for Mobile Communications (GSM).

An OFDMA network may implement a radio technology such as Evolved UTRA (E-UTRA), IEEE 802.11, IEEE 802.16, IEEE 802.20, Flash-OFDM and the like. UTRA, E-UTRA, and GSM are part of Universal Mobile Telecommunication System (UMTS). In particular, Long Term Evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed in the art. For example, the 3rd Generation Partnership Project (3GPP) is a collaboration between groups of telecommunications associations that aims to define a globally applicable third generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems, and mobile devices. For clarity, certain aspects of the apparatus and techniques are described below for LTE implementations, and LTE terminology is used in much of the description below; however, the description is not intended to be limited to LTE applications. Accordingly, it will be apparent to one of skill in the art that the apparatus and methods described herein may be applied to various other communications systems and applications.

Logical channels in wireless communications systems may be classified into Control Channels and Traffic Channels. Logical Control Channels may comprise a Broadcast Control Channel (BCCH) which is a downlink (DL) channel for broadcasting system control information, a Paging Control Channel (PCCH) which is a DL channel that transfers paging information and a Multicast Control Channel (MCCH) which is a point-to-multipoint DL channel used for transmitting Multimedia Broadcast and Multicast Service (MBMS) scheduling and control information for one or several MTCHs. Generally, after establishing a Radio Resource Control (RRC) connection this channel is only used by UEs that receive MBMS. A Dedicated Control Channel (DCCH) is a point-to-point bi-directional channel that transmits dedicated control information and is used by UEs having an RRC connection.

Logical Traffic Channels may comprise a Dedicated Traffic Channel (DTCH) which is point-to-point bi-directional channel, dedicated to one UE, for the transfer of user information, and a Multicast Traffic Channel (MTCH) for Point-to-multipoint DL channel for transmitting traffic data.

Transport Channels may be classified into downlink (DL) and uplink (UL) Transport Channels. DL Transport Channels may comprise a Broadcast Channel (BCH), Downlink Shared Data Channel (DL-SDCH) and a Paging Channel (PCH). The PCH may be used for support of UE power saving (when a DRX cycle is indicated by the network to the UE), broadcast over an entire cell and mapped to Physical Layer (PHY) resources which can be used for other control/traffic channels. The UL Transport Channels may comprise a Random Access Channel (RACH), a Request Channel (REQCH), an Uplink Shared Data Channel (UL-SDCH) and a plurality of PHY channels. The PHY channels may comprise a set of DL channels and UL channels.

In addition, the DL PHY channels may comprise the following:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)
The UL PHY Channels may comprise the following:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)
The word "exemplary" is used herein to mean "serving as an example, instance, or illustration." Any aspect and/or embodiment described herein as "exemplary" is not necessarily to be construed as preferred or advantageous over other aspects and/or embodiments.

For purposes of explanation of various aspects and/or embodiments, the following terminology and abbreviations may be used herein:
AM Acknowledged Mode
AMD Acknowledged Mode Data
ARQ Automatic Repeat Request
BCCH Broadcast Control CHannel
BCH Broadcast CHannel
C- Control-
CCCH Common Control CHannel
CCH Control CHannel
CCTrCH Coded Composite Transport Channel
CP Cyclic Prefix
CRC Cyclic Redundancy Check
CTCH Common Traffic CHannel
DCCH Dedicated Control CHannel
DCH Dedicated CHannel
DL DownLink
DSCH Downlink Shared CHannel
DTCH Dedicated Traffic CHannel
FACH Forward link Access CHannel
FDD Frequency Division Duplex
L1 Layer 1 (physical layer)
L2 Layer 2 (data link layer)
L3 Layer 3 (network layer)
LI Length Indicator
LSB Least Significant Bit
MAC Medium Access Control
MBMS Multmedia Broadcast Multicast Service
MCCH MBMS point-to-multipoint Control CHannel
MRW Move Receiving Window
MSB Most Significant Bit
MSCH MBMS point-to-multipoint Scheduling CHannel
MTCH MBMS point-to-multipoint Traffic CHannel
PCCH Paging Control CHannel
PCH Paging CHannel
PDU Protocol Data Unit
PHY PHYsical layer
PhyCH Physical CHannels
RACH Random Access CHannel
RLC Radio Link Control
RRC Radio Resource Control
SAP Service Access Point
SDU Service Data Unit
SHCCH SHared channel Control CHannel
SN Sequence Number
SUFI SUper FIeld
TCH Traffic CHannel
TDD Time Division Duplex
TFI Transport Format Indicator
TM Transparent Mode
TMD Transparent Mode Data
TTI Transmission Time Interval
U- User-
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network
MBSFN Multicast broadcast single frequency network
MCE MBMS coordinating entity
MCH Multicast channel
DL-SCH Downlink shared channel
MSCH MBMS control channel
PDCCH Physical downlink control channel
PDSCH Physical downlink shared channel A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels. The maximum spatial multiplexing $N_S$ if a linear receiver is used is min($N_T$, $N_R$), with each of the $N_S$ independent channels corresponding to a dimension. This provides an $N_S$ increase in spectral efficiency. A MIMO system can provide improved performance (e.g., higher throughput and/or greater reliability) if the additional dimensionalities created by the multiple transmit and receive antennas are utilized. The special dimension may be described in terms of a rank.

MIMO systems support time division duplex (TDD) and frequency division duplex (FDD) implementations. In a TDD system, the forward and reverse link transmissions use the same frequency regions so that the reciprocity principle allows the estimation of the forward link channel from the reverse link channel. This enables the access point to extract transmit beamforming gain on the forward link when multiple antennas are available at the access point.

System designs may support various time-frequency reference signals for the downlink and uplink to facilitate beamforming and other functions. A reference signal is a signal generated based on known data and may also be referred to as a pilot, preamble, training signal, sounding signal and the like. A reference signal may be used by a receiver for various purposes such as channel estimation, coherent demodulation, channel quality measurement, signal strength measurement and the like. MIMO systems using multiple antennas generally provide for coordination of sending of reference signals between antennas, however, LTE systems do not in general provide for coordination of sending of reference signals from multiple base stations or eNBs.

3GPP Specification 36211-900 defines in Section 5.5 particular reference signals for demodulation, associated with transmission of PUSCH or PUCCH, as well as sounding, which is not associated with transmission of PUSCH or PUCCH. For example, Table 1 lists some reference signals for LTE implementations that may be transmitted on the downlink and uplink and provides a short description for each reference signal. A cell-specific reference signal may also be referred to as a common pilot, a broadband pilot and the like. A UE-specific reference signal may also be referred to as a dedicated reference signal.

TABLE 1

| Link | Reference Signal | Description |
| --- | --- | --- |
| Downlink | Cell Specific Reference Signal | Reference signal sent by a Node B and used by the UEs for channel estimation and channel quality measurement. |
| Downlink | UE Specific Reference Signal | Reference signal sent by a Node B to a specific UE and used for demodulation of a downlink transmission from the Node B. |
| Uplink | Sounding Reference Signal | Reference signal sent by a UE and used by a Node B for channel estimation and channel quality measurement. |
| Uplink | Demodulation Reference Signal | Reference signal sent by a UE and used by a Node B for demodulation of an uplink transmission from the UE. |

In some implementations a system may utilize time division duplexing (TDD). For TDD, the downlink and uplink share the same frequency spectrum or channel, and downlink and uplink transmissions are sent on the same frequency spectrum. The downlink channel response may thus be correlated with the uplink channel response. A reciprocity principle may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

In LTE implementations orthogonal frequency division multiplexing is used for the downlink—that is, from the base station, access point or eNodeB to the terminal or UE. Use of OFDM meets the LTE requirement for spectrum flexibility and enables cost-efficient solutions for very wide carriers with high peak rates, and is a well-established technology, for example OFDM is used in standards such as IEEE 802.11a/g, 802.16, HIPERLAN-2, DVB and DAB.

Time frequency physical resource blocks (also denoted here in as resource blocks or "RBs" for brevity) may be defined in OFDM systems as groups of transport carriers (e.g. sub-carriers) or intervals that are assigned to transport data. The RBs are defined over a time and frequency period. Resource blocks are comprised of time-frequency resource elements (also denoted here in as resource elements or "REs" for brevity), which may be defined by indices of time and frequency in a slot. Additional details of LTE RBs and REs are described in 3GPP TS 36.211.

UMTS LTE supports scalable carrier bandwidths from 20 MHz down to 1.4 MHZ. In LTE, an RB is defined as 12 sub-carriers when the sub-carrier bandwidth is 15 kHz, or 24 sub-carriers when the sub-carrier bandwidth is 7.5 kHz. In an exemplary implementation, in the time domain there is a defined radio frame that is 10 ms long and consists of 10 sub frames of 1 ms each. Every sub frame consists of 2 slots, where each slot is 0.5 ms. The subcarrier spacing in the frequency domain in this case is 15 kHz. +Twelve of these subcarriers together (per slot) constitutes an RB, so in this implementation one resource block is 180 kHz. 6 Resource blocks fit in a carrier of 1.4 MHz and 100 resource blocks fit in a carrier of 20 MHz.

In the downlink there are typically a number of physical channels as described above. In particular, the PDCCH is used for sending control, the PHICH for sending ACK/NACK, the PCFICH for specifying the number of control symbols, the Physical Downlink Shared Channel (PDSCH) for data transmission, the Physical Multicast Channel (PMCH) for broadcast transmission using a Single Frequency Network, and the Physical Broadcast Channel (PBCH) for sending important system information within a cell. Supported modulation formats on the PDSCH in LTE are QPSK, 16QAM and 64QAM.

In the uplink there are typically three physical channels. While the Physical Random Access Channel (PRACH) is only used for initial access and when the UE is not uplink synchronized, the data is sent on the Physical Uplink Shared Channel (PUSCH). If there is no data to be transmitted on the uplink for a UE, control information would be transmitted on the Physical Uplink Control Channel (PUCCH). Supported modulation formats on the uplink data channel are QPSK, 16QAM and 64QAM.

If virtual MIMO/spatial division multiple access (SDMA) is introduced the data rate in the uplink direction can be increased depending on the number of antennas at the base station. With this technology more than one mobile can reuse the same resources. For MIMO operation, a distinction is made between single user MIMO, for enhancing one user's data throughput, and multi user MIMO for enhancing the cell throughput.

In 3GPP LTE, a mobile station or device may be referred to as a "user device" or "user equipment" (UE). A base station may be referred to as an evolved NodeB or eNB. A semi-autonomous base station may be referred to as a home eNB or HeNB. An HeNB may thus be one example of an eNB. The HeNB and/or the coverage area of an HeNB may be referred to as a femtocell, an HeNB cell or a closed subscriber group (CSG) cell (where access is restricted).

Attention is now directed to FIG. 1, which shows a wireless communication system 100 with multiple user equipments (UEs) 104, a home evolved NodeB (HeNB) 110, two evolved NodeBs (eNB) 102, 132, a relay node 106, and a core or backhaul network 108. The eNB 102 may be the central base station in a wireless communication system. The eNB 132 may be an eNB in an adjacent macrocell (denoted as Macro Cell 2), and may be associated with components such as those shown in FIG. 1 in communication with Macro Cell 1 (components are omitted from FIG. 1 for clarity). A UE 104 may also be called, and may contain some or all of the functionality of, a terminal, a mobile station, an access terminal, a subscriber unit, a station, etc. A UE 104 may be a cellular phone, a personal digital assistant (PDA), a wireless device, a wireless modem, a handheld device, a laptop computer, etc.

The core network 108 may be the central piece of a telecommunications network. For example, the core network 108 may facilitate communications with the Internet, other UEs, etc. A UE 104 may communicate with the core network 108 through an eNB 102, 132 or an HeNB 110. Multiple UEs 104 may be in wireless communication with an eNB 102 or an HeNB 110. eNBs 102 and 132, and HeNB 110 may communicate with the core network and/or to each other either directly or through the core network 108.

The term "eNB" may be used to refer to the eNB 102 or to the HeNB 110, because the HeNB 110 may be considered to be one type of eNB. The eNB 102 may be referred to as a macro-eNB 102 or macrocell eNB 102. A macro-eNB 102 may have a much larger range than an HeNB 110. Furthermore, a macro-eNB 102 may provide unrestricted access to UEs 104a subscribing to the core network 108 (i.e., in a non-CSG configuration). In contrast, an HeNB 110 may provide restricted access to UEs 104b belonging to a closed subscriber group (CSG). It may be assumed that a UE 104 may only communicate with a single eNB at a given time. Thus, a UE 104b communicating with an HeNB 110 may not generally simultaneously communicate with a macro-eNB 102, however, some communication may be performed to facilitate UE management, inter-cell coordination, etc. This will generally include transfer of control information but not data.

The coverage area of an eNB may be referred to as a cell. Depending on sectoring, one or more cells may be served by the eNB. The coverage area of a macroeNB 102 may be referred to as a macrocell 112 or an eNB cell (shown as Macro Cell 1 in FIG. 1). Likewise, the coverage area of an HeNB 110 may be referred to as an HeNB-cell 114 or a femtocell. As shown in FIG. 1, multiple cells may be adjacent to and/or overlapping. For example, in FIG. 1, Macro Cells 1 and 2 overlap femtocell 114. Obviously, many other variations of adjacent and/or overlapping cells are possible in various system implementations.

Multiple eNBs may have a backhaul connection with each other through the core network 108. For example, a backhaul connection may exist between the HeNB 110 and eNBs 102 and 132. In a backhaul connection, an eNB may communicate with the core network 108 and the core network 108 may correspondingly communicate with the HeNB 110. A direct connection may also exist between multiple eNBs.

For example, a direct connection may exist between the HeNB 110 and the eNB 102. The direct connection may be an X2 connection 120. Details about an X2 interface may be found in, for example, 3GPP TS 36.423 X2-AP. Multiple eNBs may also have a connection 122, 124 through use of a relay node 106. In one configuration, the relay node 106 may be the core network 108.

The coverage range for a macrocell 112 may be much larger than the coverage range for an HeNB-cell 114. In one configuration, the coverage range for a macrocell 112 may include the entire coverage range for an HeNB-cell 114.

A UE 104 may communicate with a base station (e.g., the eNB 102 or the HeNB 110) via transmissions on an uplink 116 and a downlink 118. The uplink 116 (or reverse link) refers to the communication link from the UE 104 to a base station, and the downlink 118 (or forward link) refers to the communication link from the base station to the UE 104. Thus, a UE 104a may communicate with the eNB 102 via the uplink 116a and downlink 118a. Likewise, a UE 104b may communicate with the HeNB 110 via the uplink 116b and downlink 118b.

The resources of the wireless communication system 100 (e.g., bandwidth and transmit power) may be shared among multiple UEs 104. A variety of multiple access techniques are known, including code division multiple access (CDMA), time division multiple access (TDMA), frequency division multiple access (FDMA), orthogonal frequency division multiple access (OFDMA), single-carrier frequency division multiple access (SC-FDMA), and so forth.

In some configurations, one or more macro-UEs 104a located within an HeNB-cell 114 may cause interference so as to interfere with or jam the HeNB-cell 114. For example, a macro-UE 104a located within an HeNB-cell 114 may cause interference for communications between an HeNB-UE 104b and the HeNB 110. Likewise, a macro-UE 104a within the HeNB-cell 114 may not have macrocell 112 coverage due to interference from other HeNBs or eNBs. Both uplink interference 130 and downlink interference 132 may occur.

If there are no UEs 104 in the CSG cell (e.g., HeNB cell 114), there may be no interference issues. In order to allow a successful initial access by a UE 104 to the CSG cell, the CSG cell may dynamically bias the open loop power control algorithm to balance the effect of high interference. CSG cells may also add noise to balance the uplink 116 and the downlink 118.

Inter-cell interference coordination (ICIC) may be used to prevent the uplink interference 130 and/or the downlink interference 132. Frequency ICIC may be feasible for both synchronous and asynchronous deployments. Time ICIC may be feasible in synchronized deployments. Inter-cell interference coordination and mitigation may be facilitated by coordination and control of transmissions between combinations of eNBs and HeNBs, by self-selection of cell ID, and/or by interference monitoring and receiver adjustment.

In one aspect, interference management may be facilitated by determining information associated with a cell node at the UE and supplying the information to the node (eNB or HeNB). The information may include spatial channel information, power level information, or other information associated with the femtocell or femtocell node. For example, the UE may determine Reference Signal Received Power (RSRP), which for a particular cell may be the average power measured (and the average between receiver branches) of the resource elements that contain cell specific reference signals.

The UE may also determine Reference Signal Received Quality (RSRQ) as the ratio of the RSRP and the E-UTRA Carrier Received Signal Strength Indicator (RSSI), for the reference signals. The UE may also determine other signal metrics. For example, the UE may determine power used (power contribution) for the resource elements that are used to transmit cell-specific reference signals from an eNB or HeNB (in the system bandwidth). The UE may also determine a Channel Quality Indicator (CQI), a Rank Indicator (RI), and a Precoding Matrix Indicator (PMI). The CQI provides information to the eNB or HeNB about the link adaptation parameters the UE can support at the time. The CQI is a table containing modulation and coding information. The RI is a UE recommendation for the number of layers, i.e., streams, to be used in spatial multiplexing. The UE may also determine received interference power per physical resource block, as well as thermal noise power over the system bandwidth.

Spatial channel information may be determined and composed in a measurement report to be sent to an eNB or HeNB. The spatial information and/or power information may then be used by the node to coordinate transmissions from other nodes so as to mitigate interference with the UE. Information may be communicated directly between eNBs and/or HeNBs or may be relayed using backhaul signaling.

In various implementations, power determination of the adjacent channel may be based on particular components or subcarriers of the adjacent channel signal, which may correspondingly be based on the adjacent network type. For example, the received power may be determined based on a particular subcarrier or signal in the adjacent channel, such as a pilot signal, with the determined power based on a measurement of the pilot signal. The pilot signal may be a pilot signal in a dedicated or allocated pilot sub-channel of the adjacent channel. For example, reference signals, as are defined with respect to LTE, may be used as a pilot signal and processed to determine power level. In UTRA implementations, alternate pilot signals are used and these may be used to determine adjacent network power metrics and levels. Channel characteristics, such as fading characteristics, may be determined through use of reference signals and may be reported to eNBs or HeNBs.

In some implementations, an average or peak power level measurement may be made on the adjacent channel signal. This may be, for example, a power density determination made on the adjacent channel signal. Other power determinations may also be used and/or combined with those described above. For example, in one implementation, a power density measurement may be combined with a peak determination or pilot signal determination to generate a power level metric.

In some implementations, the received signal power level metric may be based on a Reference Signal Received Power (RSRP) per resource element, with the determining including determining the Reference Signal Received Power per resource element by measuring, at the node, a Reference Signal transmitted on one of the adjacent channels. In addition, the RSRP may be based on the average of RSRP per resource element across multiple transmit antennas, such as in a MIMO system.

Figure 2:
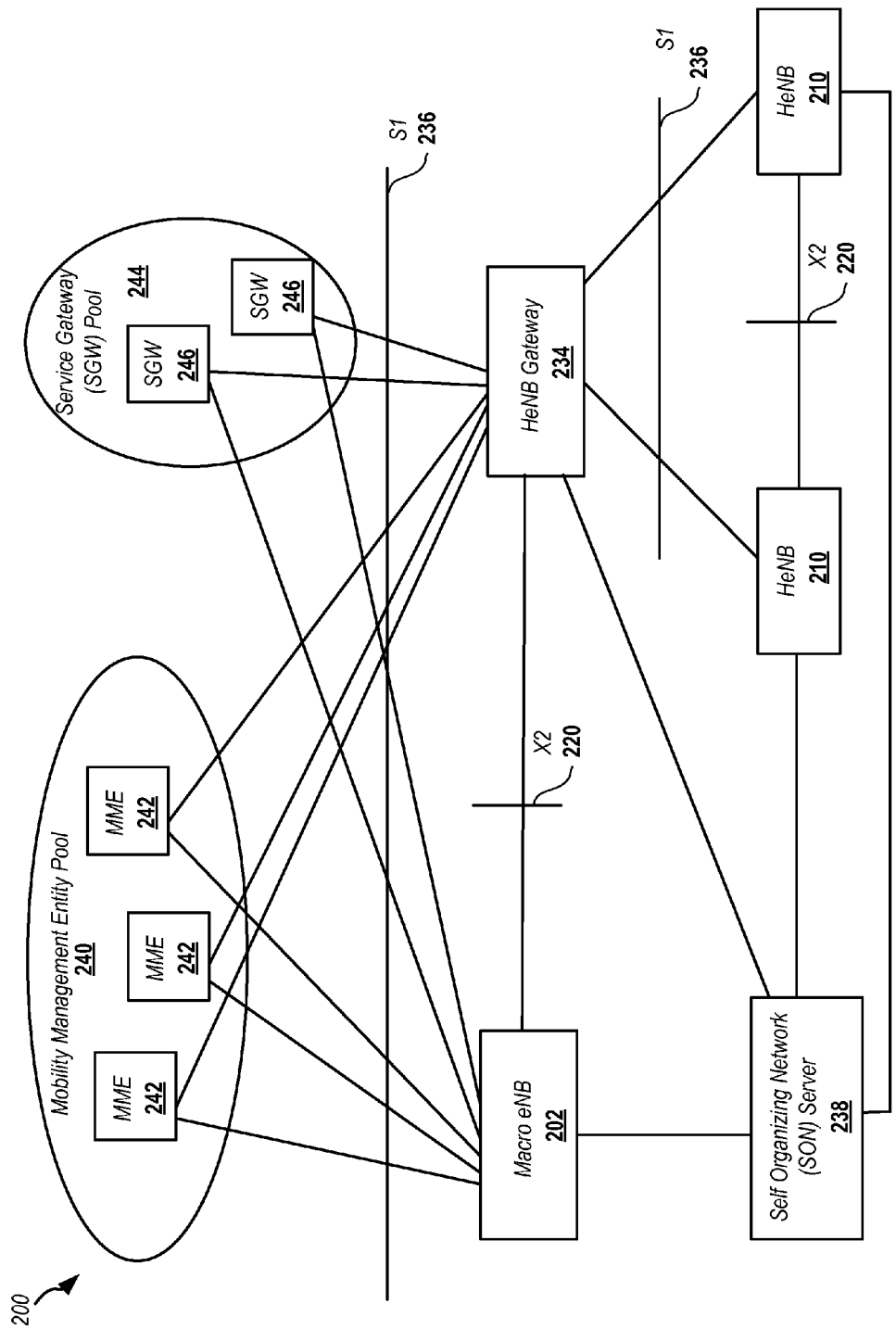
FIG. 2 illustrates details of a wireless communications system.

FIG. 2 illustrates a wireless communication system 200 with a macro-eNB 202 and multiple HeNBs 210. The wireless communication system 200 may include an HeNB gateway 234 for scalability reasons. The macro-eNB 202 and the HeNB gateway 234 may each communicate with a pool 240 of mobility management entities (MME) 242 and a pool 244 of serving gateways (SGW) 246. The HeNB gateway 234 may appear as a C-plane and a U-plane relay for dedicated S1 connections 236. An S1 connection 236 may be a logical interface specified as the boundary between an evolved packet core (EPC) and an Evolved Universal Terrestrial Access Network (EUTRAN). The HeNB gateway 234 may act as a macro-eNB 202 from an EPC point of view. The C-plane interface may be S1-MME and the U-plane interface may be S1-U.

The HeNB gateway 234 may act towards an HeNB 210 as a single EPC node. The HeNB gateway 234 may ensure S1-flex connectivity for an HeNB 210. The HeNB gateway 234 may provide a 1:n relay functionality such that a single HeNB 210 may communicate with n MMEs 242. The HeNB gateway 234 registers towards the pool 240 of MMEs 242 when put into operation via the S1 setup procedure. The HeNB gateway 234 may support setup of S1 interfaces 236 with the HeNBs 210.

The wireless communication system 200 may also include a self organizing network (SON) server 238. The SON server 238 may provide automated optimization of a 3GPP LTE network. The SON server 238 may be a key driver for improving operation and maintenance (O&M) to the wireless communication system 200. An X2 link 220 may exist between the macro-eNB 202 and the HeNB gateway 234. X2 links 220 may also exist between each of the HeNBs 210 connected to a common HeNB gateway 234. The X2 links 220 may be set up based on input from the SON server 238. An X2 link 220 may convey ICIC information. If an X2 link 220 cannot be established, the S1 link 236 may be used to convey ICIC information. Backhaul signaling may be used in communication system 200 to manage interference mitigation between macro-eNB 202 and HeNBs 210.

Figure 3:
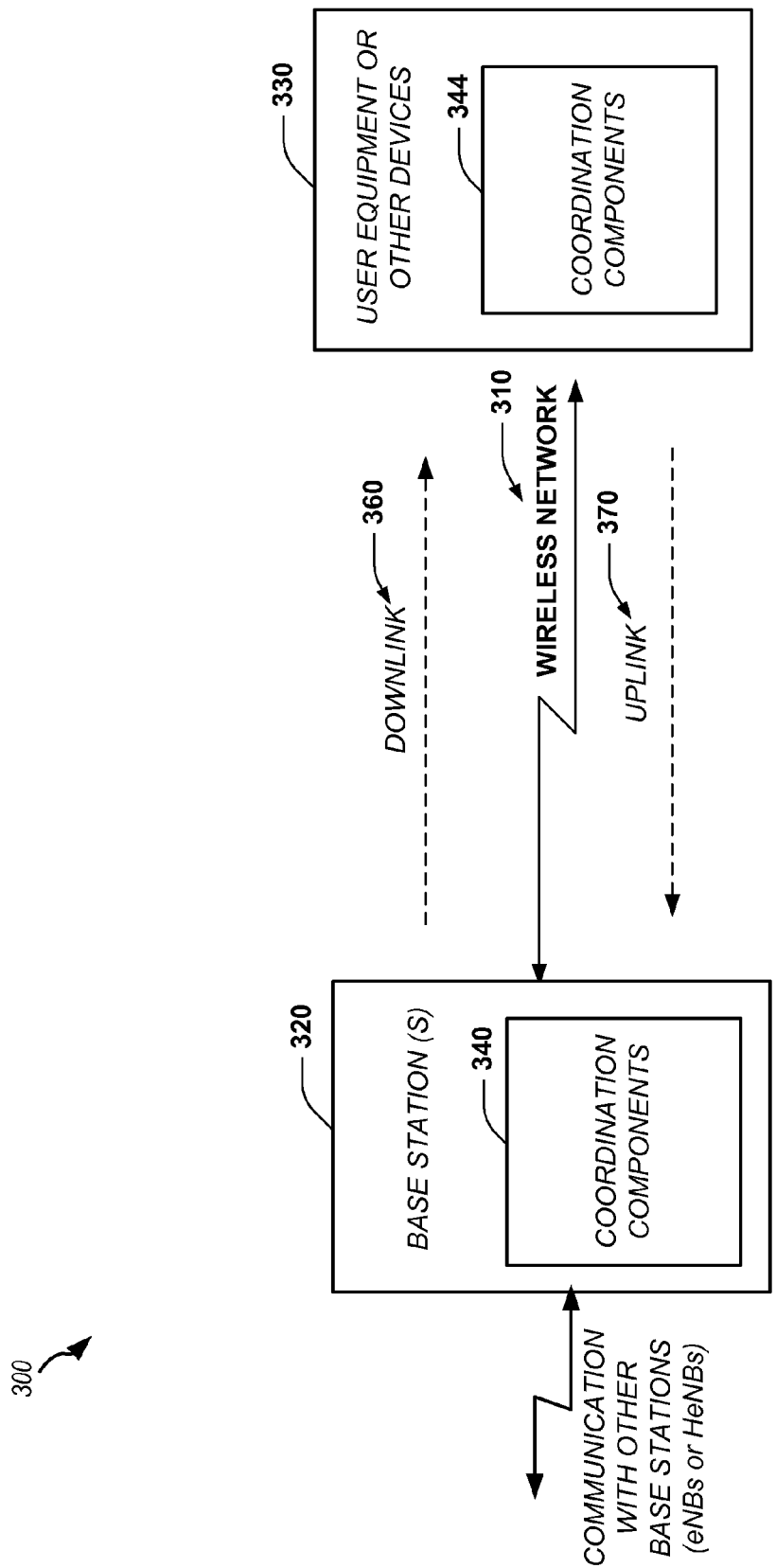
FIG. 3 is a diagram illustrating elements of a wireless communications system configured for coordination for interference mitigation.

Attention is now directed to FIG. 3, which illustrates an embodiment of a network 300 employing coordination components configured to mitigate interference across a wireless network 310.

It is noted that the system 300 can be employed with an access terminal or mobile device, and can be, for instance, a module such as an SD card, a network card, a wireless network card, a computer (including laptops, desktops, personal digital assistants (PDAs)), mobile phones, smart phones, or any other suitable terminal that can be utilized to access a network. The terminal accesses the network by way of an access component (not shown). In one example, a connection between the terminal and the access components may be wireless in nature, in which access components may be the base station and the mobile device is a wireless terminal. For instance, the terminal and base stations may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA), or any other suitable protocol.

Access components can be an access node associated with a wired network or a wireless network. To that end, access components can be, for instance, a router, a switch, or the like. The access component can include one or more interfaces, e.g., communication modules, for communicating with other network nodes. Additionally, the access component can be a base station (or wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals.

System 300 may correspond to the wireless networks shown in FIGS. 1 and 2. System 300 may include one or more base stations 320 (also referred to as a node, evolvedNode B—eNB, serving eNB, target eNB, femto station, pico station and the like) which can be an entity capable of communication over the wireless network 310 to various devices 330. For instance, each device 330 can be an access terminal (also referred to as terminal, user equipment (UE), mobility management entity (MME) or mobile device) or in some cases may be an eNB or HeNB. For purposes of brevity, the device 330 will be referred to here in as a UE and the base station 320 will be referred to herein as an eNB or HeNB. The eNB 320 and UE 330 may include coordination components 340 and 344 respectively, which may comprise hardware, software, firmware or combinations of these elements in various embodiments. It is to be appreciated that coordination to mitigate interference may occur between base stations, between base stations and devices, and/or between base stations, devices, and other network components such as a network manager or server. Coordination may include communicative connections between mobile devices and base stations, base stations and base stations, or mobile devices and mobile devices. Communications may be via wireless links or may be via wired connections such as backhaul connections.

As shown, the eNB 320 may communicate to the UE 330 (or UEs 330) via downlink 360 and may receive data via uplink 370. Such designation as uplink and downlink is arbitrary as the UE 330 can also transmit data via downlink and receive data via uplink channels. It is noted that although two network components 320 and 330 are shown, that more than two components can be employed on the network 310 in various configurations, with such additional components also being adapted for reference signal coordination as described herein.

In general, when the UE 330 cannot connect a desired cell with the strongest downlink channel, it may see strong interference in various downlink scenarios or applications. The strongest downlink channel is generally the one with the strongest reference signals. When a UE cannot connect to a desired cell with the strongest downlink channel (for example, a UE in proximity to a restricted HeNB, such UE 104 in proximity to HeNB 110 as shown in FIG. 1), or where the downlink may be good but the uplink is not, the UE may benefit from interference mitigation.

For systems deploying with varying transmitting power and/or with restricted association, or where the eNB 330 tries to balance loading by offloading some users from one cell to a different cell, such as between macrocells 1 and 2 as shown in FIG. 1, the UE may use interference cancellation or other advanced receivers to improve the receiver performance. Channel estimates are important for those advanced receivers. Channel estimation may be facilitated in systems such as LTE systems through use of reference signals, which may be arranged in resource blocks so as to allow a receiver to determine channel characteristics such as fading, power levels and the like by measuring and processing the received reference signals.

Consequently, it is desirable that the reference signal does not see strong interference, which may come from other components of a network such as are shown in FIG. 1, including other eNBs and/or HeNBs. Accordingly, in self organizing network configurations (SONs), where deployment of HeNBs may be done in a relatively uncontrolled fashion and/or may vary over time, the eNB (or HeNB) 320 may choose a cell identity to prevent cell ID collision with other cells such as other macro, pico, and/or femtocells, for example. Alternately, or in addition, further cell ID selection criteria may be enforced such that at least the reference signal will not see strong interference (for example, by halting data or control information transmission during time-frequency resources allocated to the reference signals).

Generally, reference signal resource mappings in the frequency domain are linked to the cell ID, where different cell IDs may have different frequency shifts. There are limited number of frequency locations that can be reused for reference signal. In some implementations an eNB or HeNB may search and find a suitable cell ID for itself. For example, the nodes may be part of a self organizing network (SON), e.g., where a femto cell may search for a suitable cell ID before configuring its respective cell ID. In an exemplary embodiment, the cell ID is selected so that the associated reference signals are orthogonal to another cell's reference signals. This may be done based on the shifts as defined in LTE, where in a 1 antenna MIMO system there are 6 available shifts, and in a 2 antenna system there are 3 available shifts.

Accordingly, system 300 may be configured to mitigate interference in wireless communications networks 310. In one aspect, if a base station such as an HeNB or eNB locates a strong adjacent cell, the eNB or HeNB can select a cell ID such that the associated reference signal is selected to mitigate interference with other known cells/reference signal patterns. For example, a reference signal may be selected so that its signal mappings are orthogonal to this strong cell, such as where a reference signal occupies different frequency resources used by a non-CSG cell. Different cell IDs may have different frequency shifts, however, there are a limited number of frequency locations that can be reused for reference signals.

Initial cell ID selection and assignment may be done in different ways. For example, there may be a reserved set of cell IDs assigned for femtocells (and associated HeNBs). When a new HeNB is powered up, it may initially listen to determine whether there are adjacent macrocells and/or or cells such as femtocells. Based on this information, one of the reserved cell IDs may be assigned to the new HeNB. However, if this initial cell ID corresponds with reference signals that cause interference with adjacent cells, the initial cell ID may subsequently be changed so as to address interference issues, such as is further described below.

In some cases, an eNB may decide to apply the strategy above based on the type of a cell which causes strong interference, e.g., whether the cell is a closed subscriber group (CSG) cell or non-CSG cell. A CSG cell generally has a limited number of allowable subscribers. Although a UE that is not associated with the CSG cell may be able to communicate in a limited fashion with the CSG cell, it may not be able to send or receive data. Femtocells may be CSG or non-CSG. A so-called open femtocell may be controlled by a carrier and may allow open access to any subscriber. Other femtocells may be CSG, which only certain users may access.

For example, an HeNB (or in some implementations an eNB or other base station) may initially listen to determine which other cells are adjacent, and may then select a cell ID based on the determination of cell ID/reference signals used and/or the type of cell (HeNBs have UE listening functionality). An HeNB may select or be assigned a particular cell ID if interference originates from a CSG cell, however, it may choose not to do so if the interference originates from a non-CSG cell. This selection may be based on a table or other information stored in a memory or other data storage device in the HeNB. For example, the HeNB may include a table or algorithm to determine optimal orthogonal reference signals/cell IDs based on other cells it detects at initiation and their associated cell IDs/reference signal patterns. The optimal reference signal may be selected based on the particularly identified adjacent cell IDs/reference signals, cell type and/or may also be based on other parameters such as power levels/ signal strength of the adjacent cell nodes, or other parameters. In some implementations, the cell ID may be selected based on communications with a core network and/or MME, such as are shown in FIGS. 1 and 2, which may manage cell ID assignment. In some implementations, the cell ID/reference signal selection process may be periodically or asynchronously changed in response to changing signal environments, such as where femtocells and associated HeNBs are moved around in the environment and/or are turned on and off.

In another aspect, multiple eNB's may coordinate the data/control transmission such that over certain time duration (contiguous or non-contiguous) or frequency band (contiguous or non-contiguous), certain transmit signals are halted or omitted (also denoted herein as a protected or restricted interval). For example, in some cases no data and/or control signals (other than reference signals) are transmitted to facilitate user equipment (UE) measurement on reference signal. This coordination may be done directly between two or more eNBs/HeNBs via wireless connection and/or may be managed through other connections such as through a backhaul connection to a core network as is shown in FIGS. 1 and 2.

In another aspect, a UE may measure the reference signal strength (difference or ratio) to enable or disable certain receiver functionality such as interference cancellation. For example, the UE may use the reference signal strength variation over time to determine whether to enable or disable certain receiver functionality such as interference cancellation. Metrics used may include RSPR, RSRQ, CQI Report (channel quality indication), RLM (radio link monitoring, based on SNR of reference signal) or other signal metrics. When reference signals do not collide from different cells, the reference signal strength may vary over time due to data and reference signal collision.

Nominally, the UE averages instant channel estimate (channel estimate from that symbol and/or adjacent symbols) from different sub frames or OFDM symbols by applying some filtering. Such filtering is traditionally time-invariant or tunable based on Doppler or signal-to-noise (SNR) information (i.e., fixed filtering). Alternately, in accordance with another aspect, the UE may use interference information to apply different weights on the instant channel estimates over time. This may be done when there is dynamic scheduling across different cells and each OFDM or subframe may observe different interference.

Figure 4:
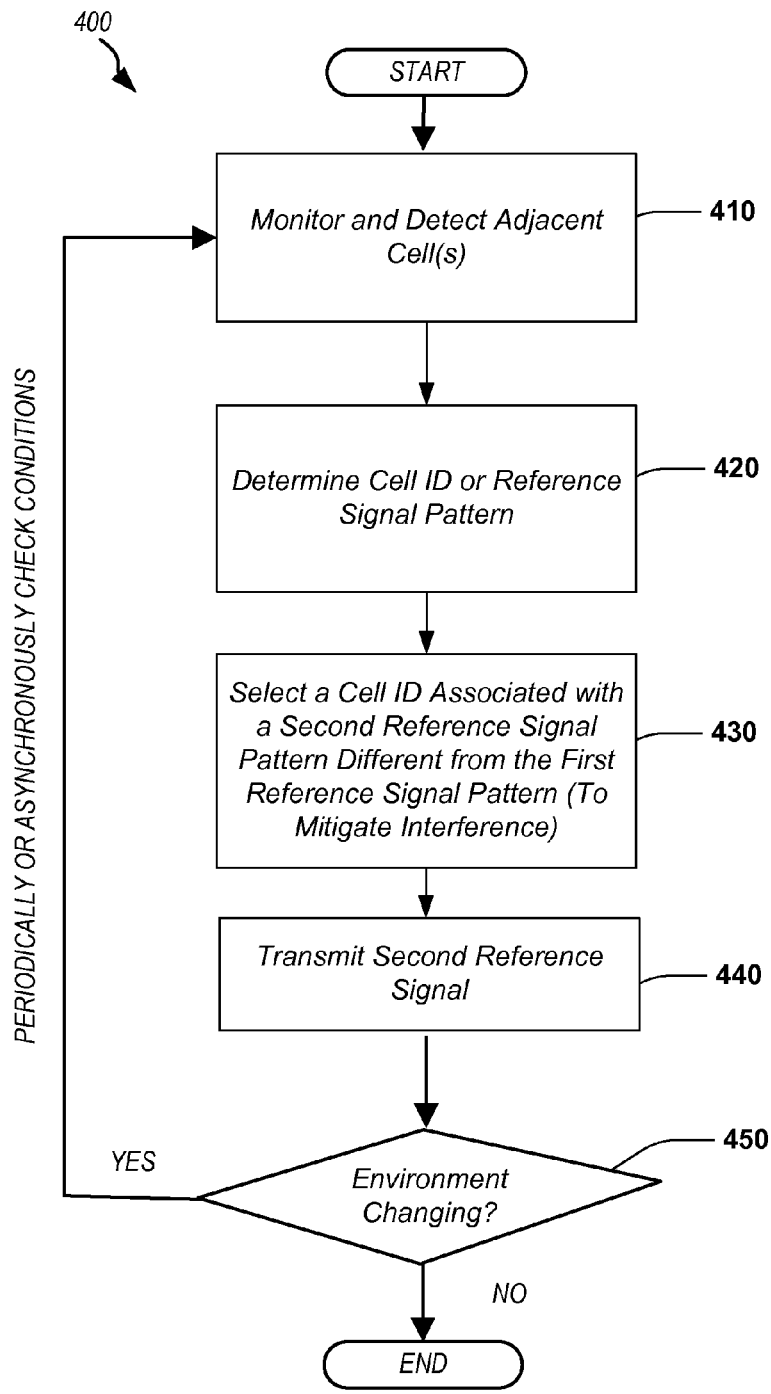
FIG. 4 showns an example process for selecting a cell ID to mitigate interference in a wireless communications system.

Attention is now directed to FIG. 4 which illustrates one embodiment of a process 400 for interference mitigation by controlling cell IDs. At stage 410, a wireless network node, which may be an eNB or HeNB, may monitor transmissions from other wireless network elements, such as other eNBs, HeNBs or UEs. For example, a newly installed or relocated HeNB may be initialized in proximity to another wireless network, such as the various networks as shown in FIG. 1. The node may initialize with a predefined cell ID and may then initially listen before starting transmissions. The node may then detect one or more adjacent cells, such as other macrocells or femtocells. At stage 420, the node may then determine a cell ID or IDs associated with the adjacent cells, and/or may determine a reference signal pattern associated with the adjacent cell or cells.

Based on this determination, the node may then select a new cell ID and/or reference signal pattern at stage 430 such that the selected reference signal will mitigate interference with the adjacent cell or cells. This determination may be further based on a power level metric associated with the adjacent cell or cells, and a threshold may be predefined such that the cell ID and associated reference signal is only changed when the interfering signal exceeds a certain power level or other signal metric. The determination may also be based on the type of adjacent cell, such as, for example, whether it is a CSG or non-CSG cell. Assuming the cell ID is to be updated, the selected reference signal may be selected to be orthogonal to one or more received reference signals associated with the other cell or cells. The selected cell ID may be based on available cell ID information that may be stored in the node, such as in a table in memory or other storage medium. The selected cell ID may also be provided to the node through a backhaul connection to a core network, such as core network 108 as shown in FIG. 1 and/or using an MME or SGW pool as shown in FIG. 2. This process may include consideration at the core network regarding allocation of reference signals between various known cells in the proximity of the node. In some embodiments, the node may communicate with nodes associated with the adjacent cells to select an appropriate cell ID and reference signal. This may be done through a direct wireless communication link and/or via a backhaul connection.

Once an appropriate selected cell ID and associated selected reference signal has been determined at stage 430, the node may then provide transmissions using the selected reference signal at stage 440. The pattern associated with the selected reference signal may then facilitate interference mitigation by being selected to minimize interference or be orthogonal to the reference signal pattern(s) of the adjacent cells, which may facilitate processing in other network elements, such as UEs, for channel estimation and/or other processing.

In some implementations, the channel may change over time, for example, if new femtocells are added or removed. Consequently, process 400 may include a decision step 450, where the process may be repeated periodically or asynchronously depending on changes in the operating environment. For example, certain adjacent cells may create interference in the evening but not during daytime. In this case, the cell ID of the node may be changed during times of interference. Other periodic or asychronous re-scheduling of cell ID and associated reference signals may also be used. In some environments, femtocells may be added or removed either periodically or at random. In these cases, two or more nodes associated with the femtocells may communicate, either directly or via a backhaul network, such as shown in FIGS. 1 and 2, to manage reference signal assignments.

As noted previously, transmissions from adjacent cells can affect performance of network components by creating interference. For example, transmissions from one eNB or HeNB may affect communications between another eNB or HeNB and a UE, or between other network devices. FIG. 1 illustrates examples of such interference. In accordance with one aspect, nodes such as eNBs and HeNBs may communicate with each other to coordinate transmissions so as to mitigate interference. This communication may be done directly between nodes and/or may be done through a backhaul connection, such as is shown in FIG. 1.

Figure 5:
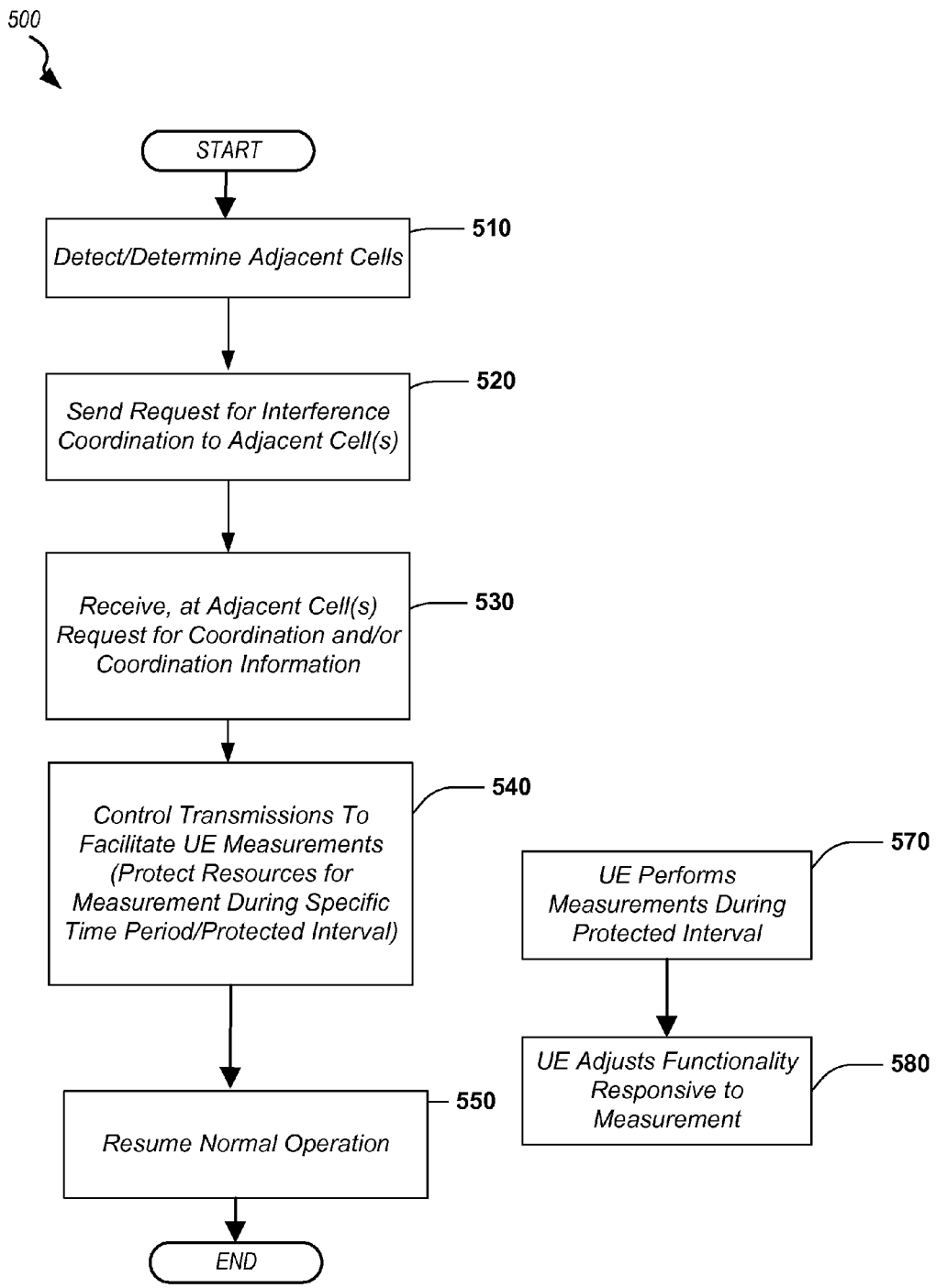
FIG. 5 shows an example process for coordination transmissions to facilitate channel measurements in a wireless communications system.

Attention is now directed to FIG. 5 which illustrates one embodiment of a process 500 for providing such coordination between network nodes. In particular, it may be desirable to perform communication between two or more base stations, such as eNBS and/or HeNBS, to coordinate so that an interfering node reserves resources (i.e., halts or refrains from transmitting certain signals during specified time, frequency or time/frequency resources) during a protected interval so that other network devices, such as UEs, can perform measurements or other signal processing.

Initially, a first network node, such as an eNB or HeNB, may be in communication with a UE (or other device), such as is shown in FIGS. 1 and 2. The UE may be performing measurements such as measuring power and/or channel characteristics or other signal metrics associated with signals transmitted by the first network node or other network nodes. Further, signals transmitted from the second network node, which may likewise be an eNB or HeNB, may be generating interference at the UE. It may be desirable to provide a communication channel to the UE from the first network node that has reduced interference from the second network node. To facilitate this, communications of coordination information may be provided between the first network node and the second network node to establish this coordination. The coordination may result in restraint or halting of transmission from the second network node during a specified time period (also described herein as a restricted time period), wherein signal transmissions from the second (and/or other) nodes are restricted. The restriction may include halting transmission of vary signal elements, such as by halting transmission of data or control signals.

In particular, in the embodiment shown in FIG. 5, the first network node may send a request at stage 520 to nodes associated with the detected one or more adjacent cells (or to other nodes known to be in proximity to the first network cell). Alternately, or in addition, a communication link may have previously been established between the first and second network nodes, or other network nodes, to facilitate this communication. In some cases, the request to initiate coordination may come initially from the second network node to the first network node, or from a UE or other network device.

In any case, the request may be received at the second network node (and/or at additional network nodes that may be adjacent and/or causing interference) at stage 530. The request may include coordination information provided from the first network node, such as cell ID, associated UEs, control information, timing or other control or data information to facilitate coordination of transmission. For example, the coordination information may include information regarding possible time and/or frequency resources in a resource block during which measurements wish to be made, which may be in a specified protected interval or time period. These may be time and/or frequency contiguous and/or non-contiguous. The information may identify types of communications during which transmission should be refrained, which may be transmission of control and/or data information. Reference signals may be sent during the specified time interval to facilitate measurements based only on the reference signals during the protected interval.

Subsequent to receipt, the first and second network nodes (and/or any other network nodes in communication) may further exchange information regarding particular resources that may be controlled so as to mitigate interference. This may involve, for example, negotiation between the network nodes to determine particular resource elements or other information to be coordinated. This may also include information associated with determinations made by agreement or by the second network node regarding transmission controls, such as, for example, time and/or frequency resources on which communications will be halted from the second network node to facilitate measurement. As noted previously, this may include certain restricted or protected time periods, frequencies, or both, which may be contiguous or non-contiguous. During these controlled time intervals, transmission of data and/or control information may be halted.

At stage 540, the second network node will then control transmissions to mitigate interference based on the transmission coordination information during a protected interval. This may be done to allow the UE to make measurements with respect to the first network node in the absence of transmissions from the second network node and/or to make other measurements or perform other signal processing at stage 570. Information regarding the controlled transmissions may be provided from the first network node to the UE, which may then use this information to perform targeted measurements and/or perform other processing during the protected interval. In some case, the UE may operate independent of knowledge of the controlled transmissions, and may provide data, such as channel measurements, power levels, or other information, to the first network node at stage 570, which may then share this information with other network nodes, such as the second network node, and/or the information may be used to control transmissions from the second network node and/or other network nodes. In some embodiments, this information may be used to determine a different reference signal pattern to be used by the first or second wireless network nodes, such as was described previously herein with respect to FIG. 4. The node may resume normal operation at stage 550. In some cases, process 500 may be repeatedly periodically or asynchronously to facilitate additional measurements and adjustments.

Measured information may further be used by the UE to control device operation. For example, a UE may perform measurements and/or other signal processing of signals received from the first wireless network node (and/or other wireless network nodes besides the second wireless network node) during the protected interval period at stage 580. These may include various metrics, such as RSRP, RSRQ, CQI information, radio link monitoring (RLM), radio link failure monitoring (RLFM) and/or other signal power metrics.

The UE may then use the information measured during the protected interval to adjust receiver functionality and/or disable or enable certain receiver functions at stage 590. For example, the information obtained during the controlled transmission period may be used by the receiver to turn on or off interference cancellation functionality in the UE. If the interference level associated with the second wireless network is high, interference cancellation may be turned off at the UE to save battery power (assuming interference cancellation would not be effective at high interference levels). Conversely, if interference from the second wireless network node is low or intermittent, interference cancellation may be enabled. Other receiver functionality, such as may be associated with the level of an interfering signal, may correspondingly be controlled in response to measurements made during the controlled transmission period.

In addition, a UE may measure reference signal strength over time and may adjust receiver functionality based on variation over time. For example, when reference signals from other cells collide over time the received signals may vary. Accordingly, metrics such as RSRP, RSPQ, CQI, radio link monitoring (RLM) measurements, radio link failure monitor (RLFM) measurements, or other signal power metrics may be used to enable or disable receiver functionality over time. This may be based on, for example, a threshold level of interference, above or below which functionality may be changed. In an exemplary embodiment, a receiver subsystem in a UE (or other network device) includes an interference cancellation (IC) module, which consumes power when on. If the determined interference level changes, the functionality of the IC module may be switched on or off, depending on whether interference cancellelation would be appropriate in the current environment.

Figure 6:
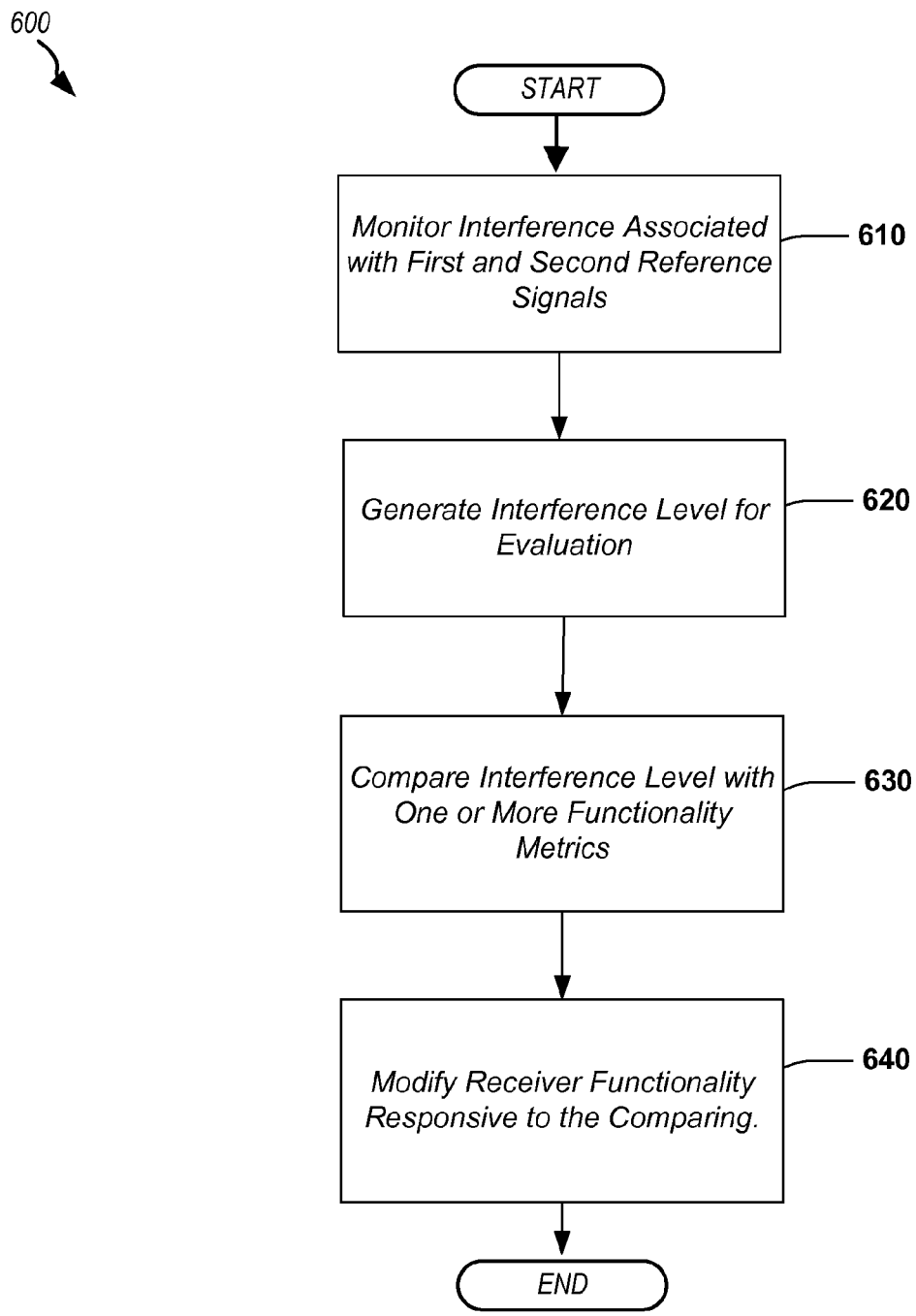
FIG. 6 shows an example process for controlling receiver functionality based on interference levels.

FIG. 6 illustrates an embodiment of a process 600 for performing dynamic functionality control. At stage 610 a receiver, such as a UE, may monitor signals received from multiple cells, with corresponding first and second cell reference signals. An interference level may be generated at stage 620 based on this monitoring, which may be, for example, a power level or signal strength parameter such as RSRP, RSRQ, RLM, RLFM, CQI, and the like, or another signal metric. At stage 630, the interference level may be compared with one or more metrics, such as a threshold value or range of values, a moving average value, or other value or parameter associated with a receiver functionality. If the interference level exceeds the threshold, a receiver functionality may be controlled. For example, inteference cancellation may be enabled or disabled in response to a dynamic interference level so as to manage battery consumption.

It is noted that the terms "first wireless network node" and "second wireless network node" are used above for purposes of explanation, and that various specific nodes in particular systems may correspond to the representative first and second wireless network nodes described herein.

As noted previously, receiver functionality such as is included in a UE performs instant channel estimates (i.e., channel estimates from a particular symbol or a symbol and adjacent symbols), which may be based on received reference signals. Traditionally, these instant channel estimates are averaged over multiple subframes or OFDM symbols, each of which have a reference signal. This is often done by using a filter such as a FIR filter, such as a 3 tap filter which may average over 2 milliseconds. The filtering is normally time-invariant or tunable based only on Doppler or signal to noise ratio (SNR) information.

In another aspect, different filtering for channel estimation may be applied over different subframes, which may be based on instant channel estimates associated with the subframes. In particular, interference levels may vary between subframes based on the particular characteristics of signals received during the subframes. For example, subframes may be subject to significant interference such as from adjacent networks, whereas other subframes may be subject to less interference. To address this, a UE (or other node implementing receiver functionality, may perform instant channel estimates and collect interference information, which may be time varying over intervals of sub-frames. Based on this information, the UE may then generate different weightings for the channel estimates and/or may apply different filtering based on the instant estimates rather than an average taken over multiple subframes.

Figure 7:
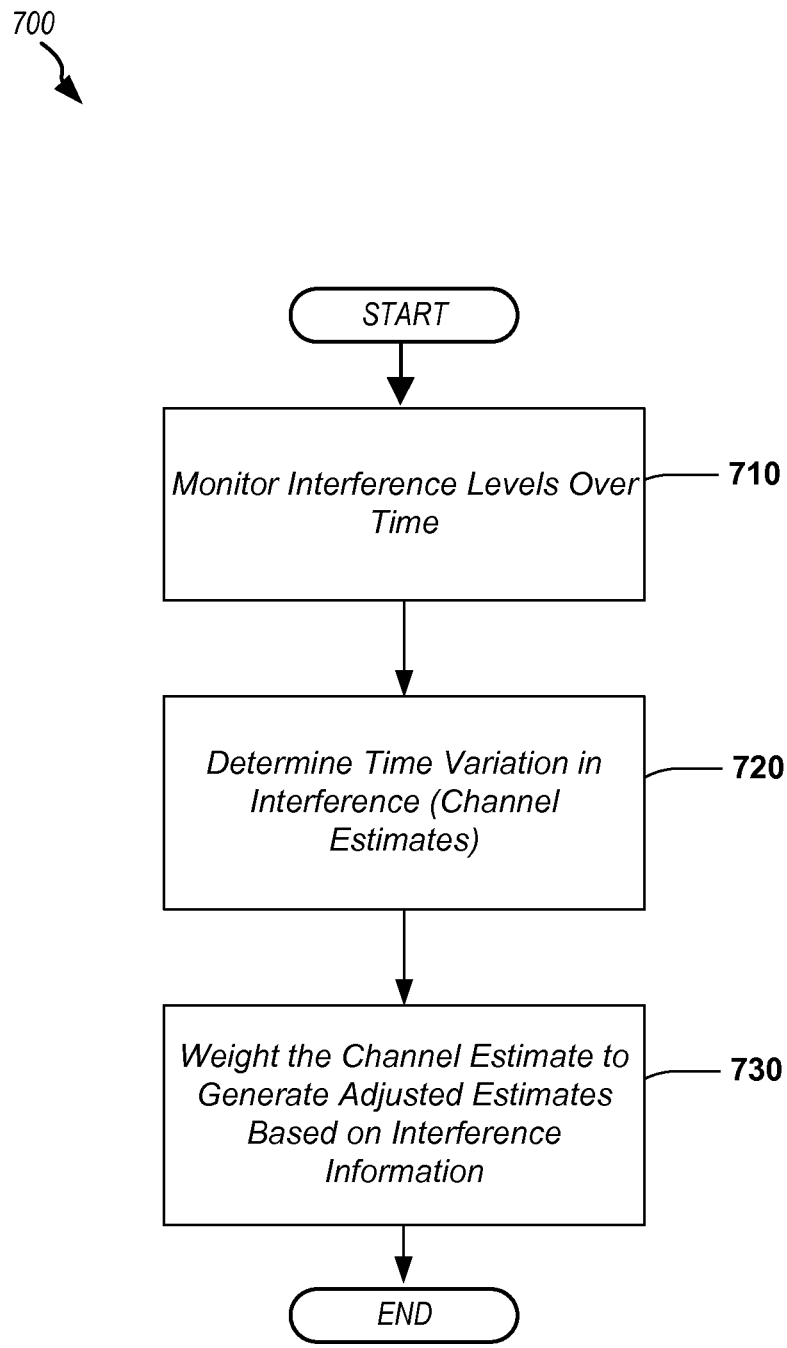
FIG. 7 shows an example process for receiver adjustment based on sub-frame interference measurement.

FIG. 7 illustrates a process 700 for adjusting a receiver to account for interference. The receiver may monitor interference levels associated with multiple adjacent cells or devices at stage 710. In particular, this may include interference from multiple reference signals from different nodes, which may increase or decrease at the level of time resolution of sub-frames. A time variation in the interference level, corresponding to subframe levels may then be determined. For example, each OFDM symbol or subframe may see different interference, which may be the case when there is dynamic scheduling across different cells. Based on detection of the interference, channel estimates may be weighted accordingly so as to allow adjustment at the sub-frame level or below at stage 730. A filter response may be adjusted based on the weighting or on the instant channel estimate.

Figure 8:
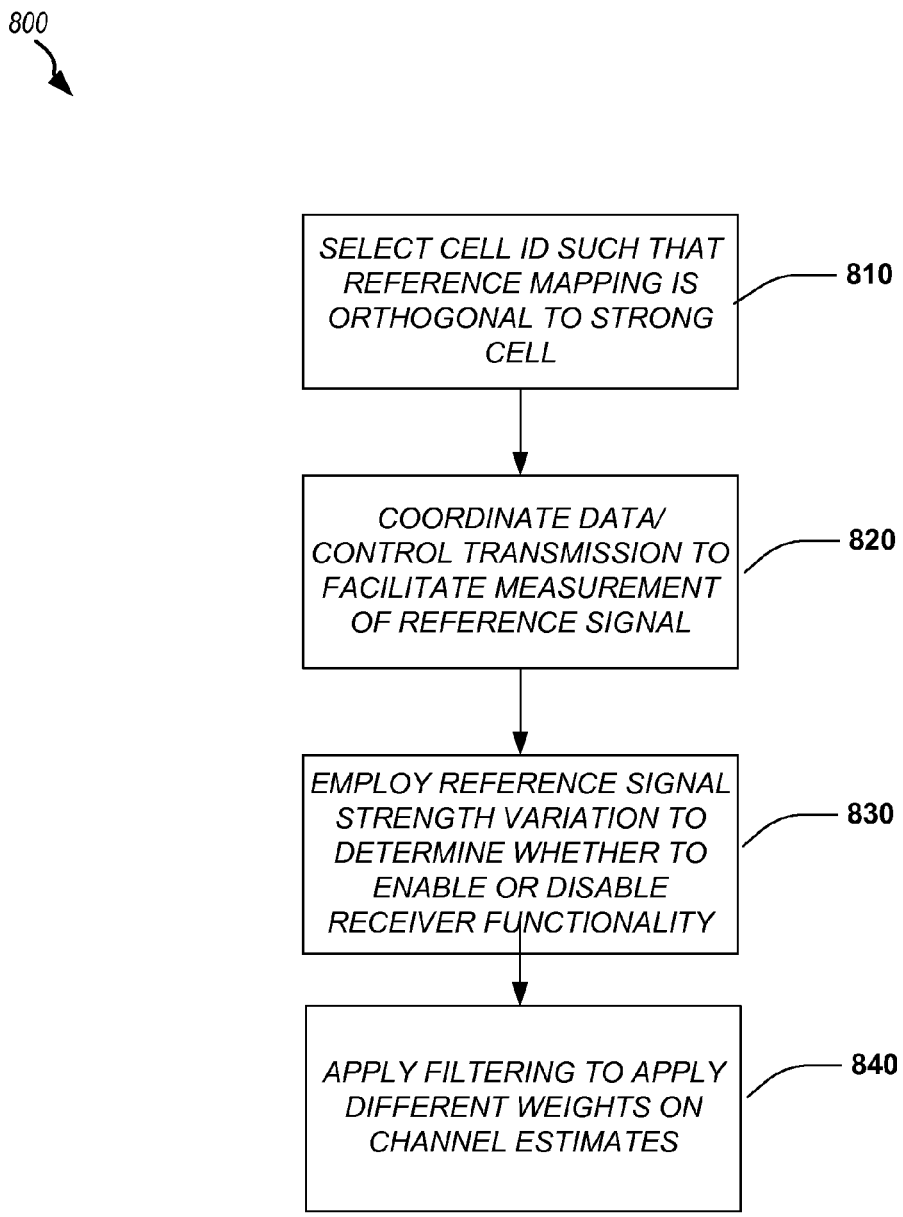
FIG. 8 shows a methodology for managing interference in a wireless communication system such as shown in FIG. 1.

Attention is now directed to FIG. 8, which illustrates a wireless communications methodology which may be implemented on a system such as is shown in FIG. 1. While, for purposes of simplicity of explanation, the methodology (and other methodologies described herein) are shown and described as a series of acts, it is to be understood and appreciated that the methodology is not limited by the order of acts, as some acts may, in accordance with one or more aspects, occur in different orders and/or concurrently with other acts from that shown and described herein. In some implementations some acts may be omitted, whereas in other implementations some acts may be added. For example, those skilled in the art will understand and appreciate that a methodology could alternatively be represented as a series of interrelated states or events, such as in a state diagram. Moreover, not all illustrated acts may be utilized to implement a methodology in accordance with the claimed subject matter.

At stage 810, reference mapping is employed. If a base station such as an eNB (or HeNB) locates a strong cell, the eNB can select a cell ID such that reference signal mapping are orthogonal to this strong cell, where a reference signal occupies different frequency resources used by this cell. The eNB may decide to apply the strategy above based on the type of a cell which causes strong interference, e.g., based on whether the cell is a closed subscriber group (CSG) cell or non-CSG cell.

At stage 820, multiple eNB's (and/or HeNBs) may coordinate data/control transmission such that over certain time periods (contiguous or non-contiguous) or frequency bands (contiguous or non-contiguous), no data and or control signal (other a reference signal) are transmitted, so as to facilitate user equipment (UE) measurements on the reference signal(s).

At stage 830, the UE may measure the reference signal strength (difference or ratio) to enable or disable certain receiver functionality such as interference cancellation. In another aspect, the UE may use reference signal strength variations over time to determine whether to enable or disable certain receiver functionality, such as interference cancellation. When reference signals do not collide from different cells, the reference signal strength may vary over time due to data and reference signal collision.

At stage 840, the UE may generate instant channel estimates (channel estimates from the corresponding OFDM symbol and/or adjacent symbols). The UE may use associated interference information to apply different weights on the instant channel estimates over time. This may be done when there is dynamic scheduling across different cells and each OFDM or subframe may observe different interference. By using this approach, receiver performance may be enhanced over traditional methods that use averaging of channel estimates.

Figure 9:
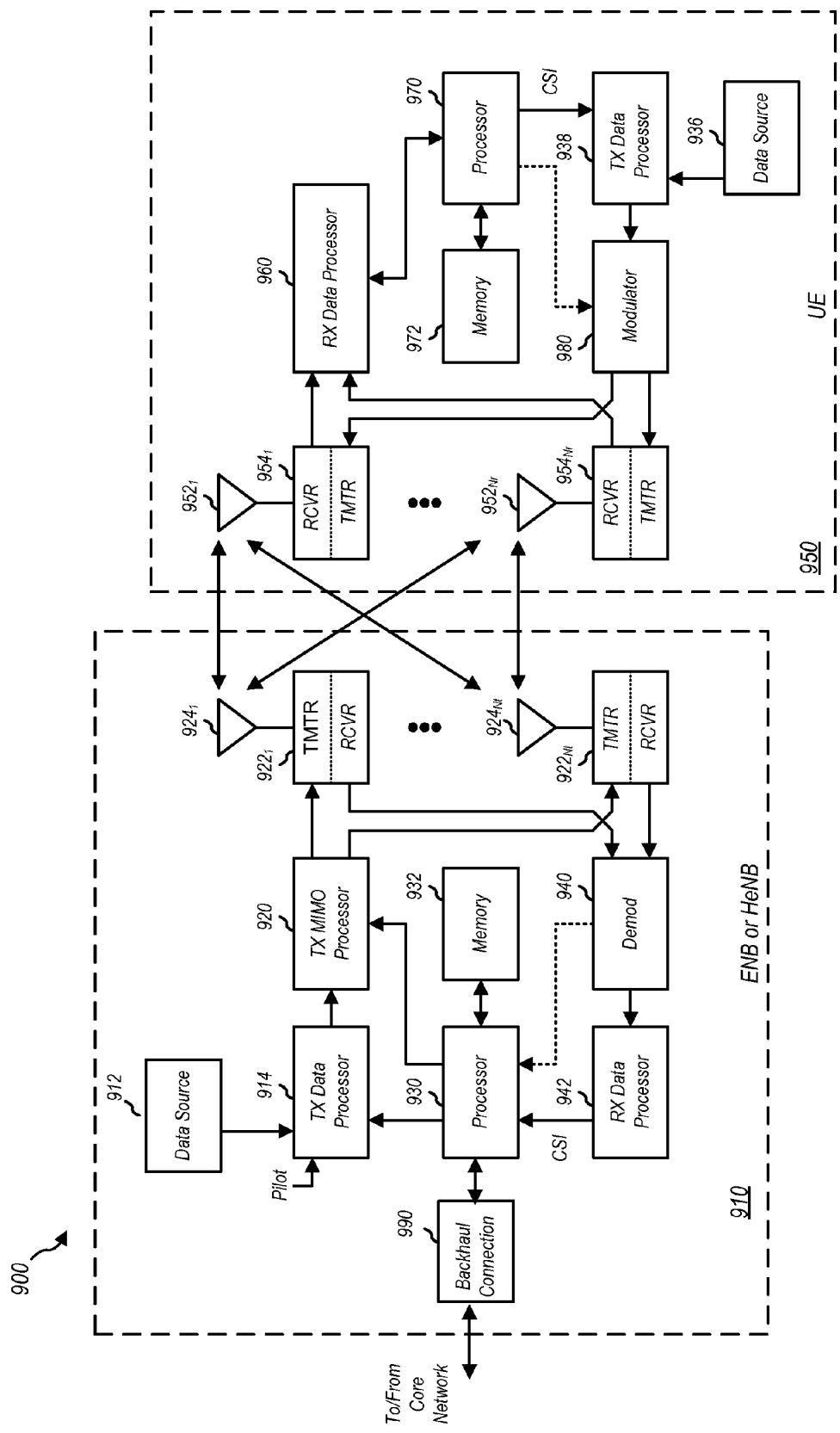
FIG. 9 is an example base station (eNB or HeNB) and associated user terminal (UE) for use in a communication system.

Attention is now directed to FIG. 9, which illustrates a block diagram of an embodiment of base station 910 (i.e., an eNB or HeNB) and a terminal 950 (i.e., a terminal, AT or UE) in an example LTE MIMO communication system 900. These systems may correspond to those shown in FIGS. 1-3, and may be configured to implement the processes illustrated previously herein in FIGS. 4-7.

Various functions may be performed in the processors and memories as shown in base station 910 (and/or in other components not shown), such as selection of cell ID based on adjacent node information, output transmit control to provide protected intervals based on coordination information received from other base stations, as well as other functions as described previously herein. UE 950 may include one or more modules to receive signals from base station 910 to determine channel characteristics such as channel estimates, demodulate received data and generate spatial information, determine power level information, and/or other information associated with base station 910.

In one embodiment, base station 910 may adjust output in response to information received from UE 950 or from backhaul signaling from another base station (not shown in FIG. 9) as described previously herein. This may be done in one or more components (or other components not shown) of base station 910, such as processors 914, 930 and memory 932. Base station 910 may also include a transmit module including one or more components (or other components not shown) of HeNB 910, such as transmit modules 924. Base station 910 may include an interference cancellation module including one or more components (or other components not shown), such as processors 930, 942, demodulator module 940, and memory 932 to provide interference cancellation functionality. Base station 910 may include a coordination module including one or more components (or other components not shown), such as processors 930, 914 and memory 932 to receive coordination information from other network devices and manage the transmitter module based on the coordination information. Base station 910 may also include a control module for controlling receiver functionality, such as turning on or off other functional modules such as the interference cancellation module. Base station 910 may include a network connection module 990 to provide networking with other systems, such as backhaul systems in the core network or other components as shown in FIGS. 1 and 2.

Likewise, UE 950 may include a receive module including one or more components of UE 950 (or other components not shown), such as receivers 954. UE 950 may also include a signal information module including one or more components (or other components not shown) of UE 950, such as processors 960 and 970, and memory 972. In one embodiment, one or more signals received at UE 950 are processed to estimate channel characteristics, power information, spatial information and/or other information regarding corresponding HeNBs, such as base station 910. Memories 932 and 972 may be used to store computer code for execution on one or more processors, such as processors 960, 970 and 938, to implement processes associated with channel measurement and information, power level and/or spatial information determination, cell ID selection, inter-cell coordination, interference cancellation control, as well as other functions as are described herein.

In operation, at the base station 910, traffic data for a number of data streams may be provided from a data source 912 to a transmit (TX) data processor 914, where it may be processed and transmitted to one or more UEs 950. The transmitted data may be controlled as described previously herein so as to mitigate interference or perform signal measurements at one or more UEs 950.

In one aspect, each data stream is processed and transmitted over a respective transmitter sub-system (shown as transmitters $924_1$-$924_{Nt}$) of base station 910. TX data processor 914 receives, formats, codes, and interleaves the traffic data for each data stream based on a particular coding scheme selected for that data stream so as to provide coded data. In particular, base station 910 may be configured to determine a particular reference signal and reference signal pattern and provide a transmit signal including the reference signal and/or beamforming information in the selected pattern.

The coded data for each data stream may be multiplexed with pilot data using OFDM techniques. The pilot data is typically a known data pattern that is processed in a known manner and may be used at the receiver system to estimate the channel response. For example, the pilot data may comprise a reference signal. Pilot data may be provided to TX data processor 914 as shown in FIG. 9 and multiplexed with the coded data. The multiplexed pilot and coded data for each data stream may then be modulated (i.e., symbol mapped) based on a particular modulation scheme (e.g., BPSK, QSPK, M-PSK, M-QAM, etc.) selected for that data stream so as to provide modulation symbols, and the data and pilot may be modulated using different modulation schemes. The data rate, coding, and modulation for each data stream may be determined by instructions performed by processor 930 based on instructions stored in memory 932, or in other memory or instruction storage media of UE 950 (not shown).

The modulation symbols for all data streams may then be provided to a TX MIMO processor 920, which may further process the modulation symbols (e.g., for OFDM implementation). TX MIMO processor 920 may then provide Nt modulation symbol streams to $N_t$ transmitters (TMTR) $922_1$ through $922_{Nt}$. The various symbols may be mapped to associated RBs for transmission.

TX MIMO processor 920 may apply beamforming weights to the symbols of the data streams and corresponding to the one or more antennas from which the symbol is being transmitted. This may be done by using information such as channel estimation information provided by or in conjunction with the reference signals and/or spatial information provided from a network node such as a UE. For example, a beam B=transpose([b1 b2 . . . $b_{Nt}$]) composes of a set of weights corresponding to each transmit antenna. Transmitting along a beam corresponds to transmitting a modulation symbol x along all antennas scaled by the beam weight for that antenna; that is, on antenna t the transmitted signal is bt*x. When multiple beams are transmitted, the transmitted signal on one antenna is the sum of the signals corresponding to different beams. This can be expressed mathematically as B1x1+B2x2+$BN_S$×$N_S$, where $N_S$ beams are transmitted and xi is the modulation symbol sent using beam Bi. In various implementations beams could be selected in a number of ways. For example, beams could be selected based on channel feedback from a UE, channel knowledge available at the eNB, or based on information provided from a UE to facilitate interference mitigation, such as with an adjacent macrocell.

Each transmitter sub-system $922_1$ through $922_{Nt}$ receives and processes a respective symbol stream to provide one or more analog signals, and further conditions (e.g., amplifies, filters, and upconverts) the analog signals to provide a modulated signal suitable for transmission over the MIMO channel. $N_t$ modulated signals from transmitters $922_1$ through $922_{Nt}$ are then transmitted from $N_t$ antennas $924_1$ through $924_{Nt}$, respectively.

At UE 950, the transmitted modulated signals are received by $N_r$ antennas $952_1$ through $952_{Nr}$, and the received signal from each antenna 952 is provided to a respective receiver (RCVR) $954_1$ through $952_{Nr}$. Each receiver 954 conditions (e.g., filters, amplifies and downconverts) a respective received signal, digitizes the conditioned signal to provide samples, and further processes the samples to provide a corresponding "received" symbol stream.

An RX data processor 960 then receives and processes the $N_r$ received symbol streams from $N_r$ receivers $954_1$ through $952_{Nr}$ based on a particular receiver processing technique so as to provide $N_S$ "detected" symbol streams so at to provide estimates of the $N_S$ transmitted symbol streams. The RX data processor 960 then demodulates, deinterleaves, and decodes each detected symbol stream to recover the traffic data for the data stream. The processing by RX data processor 960 is typically complementary to that performed by TX MIMO processor 920 and TX data processor 914 in base station 910.

A processor 970 may periodically determine a precoding matrix for use as is described further below. Processor 970 may then formulate a reverse link message that may comprise a matrix index portion and a rank value portion. In various aspects, the reverse link message may comprise various types of information regarding the communication link and/or the received data stream. The reverse link message may then be processed by a TX data processor 938, which may also receive traffic data for a number of data streams from a data source 936 which may then be modulated by a modulator 980, conditioned by transmitters $954_1$ through $954_{Nr}$, and transmitted back to base station 910. Information transmitted back to base station 910 may include power level and/or spatial information for providing beamforming to mitigate interference from base station 910.

At base station 910, the modulated signals from UE 950 are received by antennas 924, conditioned by receivers 922, demodulated by a demodulator 940, and processed by a RX data processor 942 to extract the message transmitted by UE 950. Processor 930 then determines which pre-coding matrix to use for determining beamforming weights, and then processes the extracted message.

In some configurations, the apparatus for wireless communication includes means for performing various functions as described herein. In one aspect, the aforementioned means may be a processor or processors and associated memory in which embodiments reside, such as are shown in FIG. 9, and which are configured to perform the functions recited by the aforementioned means. The may be, for example, modules or apparatus residing in UEs, HeNBs and/or eNBs such as are shown in FIGS. 1-3 and FIG. 9. In another aspect, the aforementioned means may be a module or any apparatus configured to perform the functions recited by the aforementioned means.

In one or more exemplary embodiments, the functions, methods and processes described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

It is understood that the specific order or hierarchy of steps or stages in the processes and methods disclosed are examples of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the disclosure is not intended to be limited to the aspects shown herein but is to be accorded the widest scope consistent with the principles and novel features disclosed herein. It is intended that the following claims and their equivalents define the scope of the disclosure.

I claim:

1. A method, comprising:
   receiving a first reference signal transmitted by a first network node;
   receiving a second reference signal transmitted by a second network node; and
   modifying a functionality of a receiver based upon a relationship between the first reference signal and the second reference signal.

2. The method of claim 1, wherein the relationship comprises a difference.

3. The method of claim 1, wherein the relationship comprises a ratio.

4. The method of claim 1, wherein the functionality of the receiver comprises interference cancellation.

5. The method of claim 1, wherein the modifying comprises disabling the functionality of the receiver.

6. The method of claim 1, wherein the modifying comprises enabling the functionality of the receiver.

7. A non-transitory computer readable medium including codes for causing a computer to:
   receive a first reference signal transmitted by a first network node;
   receive a second reference signal transmitted by a second network node; and
   modify a functionality of a receiver based upon a relationship between the first reference signal and the second reference signal.

8. The non-transitory computer readable medium of claim 7, wherein the relationship comprises a difference.

9. The non-transitory computer readable medium of claim 7, wherein the relationship comprises a ratio.

10. The non-transitory computer readable medium of claim 7, wherein the functionality of the receiver comprises interference cancellation.

11. The non-transitory computer readable medium of claim 7, wherein the modifying comprises disabling the functionality of the receiver.

12. The non-transitory computer readable medium of claim 7, wherein the modifying comprises enabling the functionality of the receiver.

13. An apparatus for use in a communication system, comprising:
    a receiver module configured to receive a first reference signal transmitted by a first network node and a second reference signal transmitted by a second network node; and
    a control module configured to modify a functionality of a receiver based upon a relationship between the first reference signal and the second reference signal.

14. The apparatus of claim 13, wherein the relationship comprises a difference.

15. The apparatus of claim 13, wherein the relationship comprises a ratio.

16. The apparatus of claim 13, further comprising an interference cancellation module and wherein the functionality of the receiver comprises interference cancellation.

17. The apparatus of claim 13, wherein the modifying comprises disabling the functionality of the receiver.

18. The apparatus of claim 13, wherein the modifying comprises enabling the functionality of the receiver.

19. An apparatus for use in a communication system, comprising:
    means for receiving a first reference signal transmitted by a first network node and a second reference signal transmitted by a second network node; and
    means for modifying a functionality of a receiver based upon a relationship between the first reference signal and the second reference signal.

20. The apparatus of claim 19, wherein the relationship comprises a difference.

21. The apparatus of claim 19, wherein the relationship comprises a ratio.

22. The apparatus of claim 19, wherein the functionality of the receiver comprises interference cancellation.

23. The apparatus of claim 19, wherein the means for modifying comprises disabling the functionality of the receiver.

24. The apparatus of claim 19, wherein the means for modifying comprises enabling the functionality of the receiver.

* * * * *